(12) United States Patent
Zawadzki

(10) Patent No.: US 8,037,453 B1
(45) Date of Patent: Oct. 11, 2011

(54) SYSTEM AND METHOD FOR CONTINUOUS SOFTWARE CONFIGURATION, TEST AND BUILD MANAGEMENT

(75) Inventor: Maciej Zawadzki, Cleveland Heights, OH (US)

(73) Assignee: Urbancode, Inc., Cleveland, OH (US)

( * ) Notice: Subject to any disclaimer, the term of this patent is extended or adjusted under 35 U.S.C. 154(b) by 1062 days.

(21) Appl. No.: 11/855,137

(22) Filed: Sep. 13, 2007

Related U.S. Application Data

(60) Provisional application No. 60/825,550, filed on Sep. 13, 2006.

(51) Int. Cl.
*G06F 9/44* (2006.01)
*G06F 9/45* (2006.01)

(52) U.S. Cl. ........ 717/123; 717/107; 717/124; 717/126; 717/137

(58) Field of Classification Search .......... None
See application file for complete search history.

(56) References Cited

U.S. PATENT DOCUMENTS

| | | | | |
|---|---|---|---|---|
| 5,457,797 A | * | 10/1995 | Butterworth et al. | 719/320 |
| 6,487,713 B1 | * | 11/2002 | Cohen et al. | 717/105 |
| 7,003,560 B1 | * | 2/2006 | Mullen et al. | 709/223 |

* cited by examiner

*Primary Examiner* — Chuck Kendall
(74) *Attorney, Agent, or Firm* — Thompson Hine LLP

(57) ABSTRACT

A system and method for performing continuous configuration, test, and build management for developing and building software applications is provided. In building the desired software applications, a build manager system is configured to first obtain the target source code from a source code repository. The build manager system then transforms the source code to generate a living build comprising one or more artifacts. The build manager system manages the artifacts and performs additional secondary tests and secondary processing including integration, quality and evaluation tests without requiring an additional transformation of the source code. The build manager system retains and associates the results from the secondary processes such that traceability between source code, builds, and artifacts are enforced and the build process is controlled.

20 Claims, 22 Drawing Sheets

FIG. 14

/— 1400 anthillpro3    by urban(code)   /—1410                    Hello admin | logout | profile

| Dashboard | Current Activity | Search | Administration | System |

Admin>>Repositories>>SVN Repository

Repositories : SVN Repository

Configure the Repository Type in this section. Once a Repository Type is selected, additional properties specific to that Repository Type will be displayed.

Type:          [Subversion]           The type of repository configuration to being configured.
                         \— 1402
[Set]

| Main |

The Subversion Repository type configures all the information required by Anthill to access an actual Subversion repository.

Name: *       1404  [SVN Repository]          The name of this repository configuration.

Description:        [An example repository]   A description of this repository configuration.

Root URL:*          [file:///programs/scmtool] The base URL of the repository.

Username:     1404  [                    ]    The username to use when accessing the repository.

Password:           [                    ]    The password corresponding to the account specified in the Username field.

Command Path:       [                    ]    The location of the svn executable, if not in system path.

[Edit] [Done]

FIG. 15

| Create Module | | | |
|---|---|---|---|
| | Source URL | Tags URL | Delete |
| Anthill-Example/trunk | Anthill-Example/tags | | |

Main the root URL for this Subversion repository is:
file:///programs/scmtools/data/subrepos/ — 1502
The URLs below should be relative to this location.

Source URL: [Anthill-Example/trunk]   The root URL of the project source.

Tags URL: [Anthill-Example/tags]   The URL where tagged versions of the source should not be copied. This field is necessary if you plan to create or use tags for this module within Anthill.

Tag: [          ]   The Tag to use for checkout. This may include variables passed to the workflow via ${property:Name} format.

Revision: [          ]   The Revision to use for checkout. This may include variables passed to the workflow via ${property:Name} format.

[Save] [Cancel]

| Main | Builders | Publishers |

[ Create Builder ]

| Name | Type |
|---|---|
| Build | AntBuildStep |

| Main | Properties | Environment Vars |

Configure the main ant settings in this section.

Name: *    [Build]                              A short, descriptive name for this builder.
                                                ⎯ 1702
Ant Script File:* [Anthill-Example/build/build.xml]  The name of the ant script file.

Target Name:   [                    ]           The name of the target to run in the ant script file.

Ant Configuration: [${env/ANT_HOME}]            The path to the version of ant that will be used to run the build script.

JVM Configuration: [${env/JAVA_HOME}]           The path to the Java version used to compile the code.

JVM Properties: [                    ]          Properties passed to the JVM.

⎯ 1706
Continuation condition:  ⦿ All steps passed     The conditions which must be met in order for the process to continue
                         ○ Previous step passed  (Otherwise this step will be skipped).
    1704⎯               ○ Any step failed
                         ○ Always
                         ○ Never Timeout:       [10]                             Enter the time in minutes after the start of the step when Anthill will
                                                consider the step as timed out and abort it.
                                    ⎯ 1708      The step will be marked as failed and the job execution will continue
                                                based on that outcome.
                                                Default value is 0 which means that the step never times out.

[ Save ] [ Cancel ]

FIG. 18

1800 anthillpro3  by urban(code)  Hello admin | logout | profile

| Dashboard | Current Activity | Search | Administration | System |

Admin>>Projects>>Example Project>>Mainline Build Workflow

Mainline Build Workflow

| Main | Properties | Dependencies | Artifacts |

Manage a workflow- one or more activities that are run in sequence. ← 1802

| Name: * | Mainline Build Workflow | The name of the workflow. |
| Description: | | The description of the workflow. |
| Server Group:* | Build-Farm ▼ ← 1804 | The Server Group for this workflow. |
| Notification Scheme: | Default Notification Scheme ▼ | The Notification Scheme to use for this workflow. |
| Lockable Resource: | --None-- ▼ ← 1806 / 1808 | The Lockable Resource this workflow should obtain before running (if any). |
| Source Configuration: * | Example Mainline ▼ | The source config. |
| Stamp for "DEV": * | Version Stamping ▼ | The stamp. |

[Edit] [Done]

| Workflow Activities | ← 1810 | [New] |
| Name | Type | Operations |
| Build Activity | | View|Up|Down|Delete |

SYSTEM AND METHOD FOR CONTINUOUS SOFTWARE CONFIGURATION, TEST AND BUILD MANAGEMENT

CROSS-REFERENCE TO RELATED APPLICATIONS

This application claims the benefit of U.S. Provisional Application Ser. No. 60/825,550, entitled, "SYSTEM AND METHOD FOR CONTINUOUS SOFTWARE CONFIGURATION, TEST AND BUILD MANAGEMENT," filed on Sep. 13, 2006.

TECHNICAL FIELD

The subject matter described herein relates to software build management that enables software development, configuration, and test capabilities to be tightly integrated with the build management process.

BACKGROUND

Typically, a software build process takes source code and other configuration data as input and produces artifacts, also referred to as derived objects, as output. Software artifacts define a superset that includes output (also known as derived objects) including, but not limited to, specifications, architecture and design models, source and executable code, configuration, test data, scripts, process models, project plans, and documentation. The exact number and definition of steps in the software build process depends greatly on the types of inputs (e.g., Java, C/C++, or Perl/Python/Ruby source code) and the type of desired output such as the goals of the build process (e.g. creating an intermediate output for test and verification, working or continuous production, or full production build) of a desired version of the software, and even the desired output environment (e.g., CD image, downloadable zip file, or self-extracting binary for a particular system). If the source code includes a compiled language, the build process would likely include a compilation and perhaps a linking step.

The identification of the inputs to the build process is itself part of the process. Often selection of inputs is automatic and/or implicit and is therefore hidden from view of users, making the selection step easy to overlook. For example, when a developer runs a development build, the selection of inputs (e.g., source code and configuration data) is implicit, but still occurs. The sources that are present on that particular developer's development environment are effectively selected as inputs to the build process. When the build process is performed in a clean environment, the identification of the inputs has to be explicit. For example, when a build takes place on a build server, one of the first steps is to retrieve explicitly specified source code, such as from a source code repository or other artifact storage system. The retrieved source code is used as the input for the build.

A controlled build process is a build process that makes the definition of the explicit inputs and is comprised of a series of explicitly defined steps used to produce the output (e.g., artifacts or derived objects). A controlled build process is repeatable; given the same inputs, it should produce the exact same outputs. A controlled build process also provides traceability from the sources to artifacts and from the artifacts back to the sources, thereby ensuring tests results are related to both artifacts and the resulting output from the build process simultaneously. In order to provide this traceability, each invocation of the controlled build process is uniquely identifiable. In one embodiment, an identifier such as a build number is used to identify separate builds. Controlled build processes are not necessarily automated, although automation certainly facilitates the process and helps ensure consistency.

In general, two primary types of builds take place during a software development project: developer builds and authoritative builds. Developer builds are performed by the developers in the course of development in their software development environments. By their very nature, these are non-controlled builds. There is no explicit definition of the inputs to the build process. The inputs are the sources and configurations that happen to exist in the developer's environment at the time of the software build. Typically, there is no way to track these inputs; therefore, the historical revision of any of the source files is unknown. In fact, some of the source files may include changes that have not been committed to the Source Code Management (SCM) system, or worse yet, they may include files that were modified outside the knowledge of the SCM and without permission or authority to modify those files.

Authoritative builds, on the other hand, are the embodiments of the controlled build process. Authoritative builds take place on a clean environment where all inputs are explicitly defined and controlled. Typically, an authoritative build takes the source code directly from the SCM and uses only explicitly defined environmental dependencies, which also can be defined by the SCM. During the authoritative build, explicitly defined steps are executed in a deterministic order. In general, a mechanism is provided to allow for traceability such as a build number and/or a SCM label. The build number uniquely identifies each particular authoritative build and its artifacts (derived objects) and the SCM label (or baseline) provides traceability back to the inputs.

A build management system (build management system 102) is a software tool typically used by developers in conjunction with an SCM to perform and manage authoritative builds. build management system 102 software is responsible for providing a clean environment for the authoritative build, determining what inputs are to be used for a build and then obtaining those inputs from a known source, such as from an SCM. The build management system 102 also performs and manages the steps required to execute the build process and generate the artifacts.

The generated artifacts from the build process also must be stored and maintained. For example, the artifacts are sometimes in the source control management (SCM) system or they can be stored various locations in the system 100, including with a flat file storage system or on the file system of a host computer. SCMs, however, are designed to store source code and thus optimized for use cases related to the storage and retrieval of source code and not for build artifacts. In particular, SCM systems have difficulties tracing artifacts to the build that produced them because the structure of an SCM does not provide direct mechanisms for code traceability. Instead, SCMs attempt to create a mechanism to implying traceability. For example, labels or tags, snapshots or baselines, depending on the SCM, branches or streams; and the file system namespace organization can all be used in an attempt to trace the build that produced a particular artifact. Further, SCMs are typically not designed to optimize access to the artifacts, or optimize the storage of artifacts. In particular, storing artifacts in a SCM is burdensome because SCMs are designed to track the evolution of file contents, not to store efficiently sets of files and provide traceability to a build. Furthermore, access to artifacts is not optimized because most SCMs optimize access to the latest revision of a file. The build management system 102 in contrast requires access to artifacts that were not generated by the latest build. Finally, storage of artifacts in a SCM is often not optimized because most SCMs do not optimize the storage of binary files and most build artifacts are binary.

In a conventional software development environment, projects utilize multiple types of builds, such as local development builds, continuous integration builds, nightly builds, and release builds. In this conventional context, the build process includes the transformation of source code to a program object and other artifacts associated with a given build, as well as additional processing, such as testing or deployment of a given build to a desired environment or target build purpose. It is common for organizations to utilize large numbers of different build types, varying, for example, according to build scope, purpose, targets, and environment, during the development of complex software.

Build types are separated into two distinct classes of builds: local development builds and authoritative builds, where authoritative builds take place on a build management server. Authoritative builds such as continuous integration, nightly, or release builds are not truly different types of builds, but rather different stages of the build life. A build may start out as a continuous integration build, designed to run only the most important automated tests to verify specific aspects of the build. For a continuous integration build the focus is on providing quick feedback to the development team. The last successful build for any day may be run through a more exhaustive test suite during the night and thus become the nightly build. Based upon a large number of factors, such as the features included in a build or the timeline of the project, a build in some instances is a release build. A build may even be deployed or promoted to the quality assurance (QA) environment or production.

In conventional build systems, each build is a single event in time. Once a conventional pure build is completed, nothing else can be added to that build. It is impossible to add a process to run automated functional tests to a traditional build after that build has completed. To deal with this problem, multiple build types are created. For example a continuous integration build performs a pure build, namely getting the source from the SCM, transforming it, and then running continuous integration tests on that pure build. Similarly a conventional nightly build separately gets the source from the SCM, transforms it, and then runs functional test on that separate pure build. Then once again, for a release build source is once again separately obtained from the SCM, separately built as a new pure build, and followed by deployment of the separately built software and artifacts to the target environment. In this manner the pure build 200 process is repeated multiple times, even if the underlying code has not been modified or changed in any manner.

During software development, source code files are in a constant state of change. This means that the files that were used by the continuous integration build 302 are most likely different than the files used by the nightly build 304, which are likely to be different than the files used by the release build 306.

Additionally, every build process in a conventional system produces a separate set of artifacts. The continuous integration build produces a first set of artifacts that it uses for continuous integration tests. The nightly build then produces a second, distinct set of artifacts, even if the nightly build utilizes the exact same source code as the continuous integration build. Furthermore, the release build creates yet another set of artifacts, regardless of whether it also uses the same source code as the other builds. Consequently, the artifacts being deployed by the release build are not the same as those that were used in the exhaustive nightly test test suite run during as part of the nightly build.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

FIG. 14 is an exemplary user interface for defining source code repositories.

FIG. 15 is an exemplary user interface for creating a module to define source code location to the system.

FIG. 16 depicts and example user interface for defining stamp templates.

FIG. 17 is an exemplary user interface used to define a job.

FIG. 18 is an exemplary user interface for defining a workflow.

DETAILED DESCRIPTION

1. The Living Build

Figure 1:
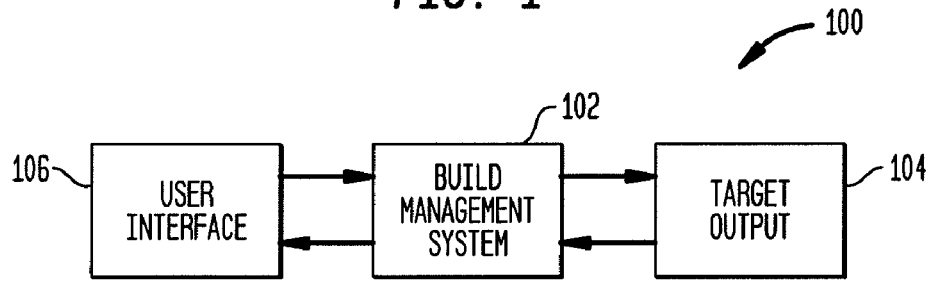
FIG. 1 is a block diagram of an exemplary software configuration, test and build system in accordance with an aspect of the subject matter described herein.

Referring to FIG. 1, an exemplary software configuration, testing and build system (the "system 100") is illustrated. As used herein, the term "exemplary" indicates a sample or example; it is not indicative of preference over other aspects or embodiments. The system 100 includes a build management system 102 that directs software build processes and testing. In contrast to conventional build systems, the illustrated build management system 102 manages living or dynamic builds rather than static builds.

As discussed conventional build systems create and discard independent builds. In contrast, living build or builds defined by the build management system 102 evolve and adapt throughout the development life cycle allowing for a dynamic build process. In certain embodiments, intermediary artifacts produced by the transformation or conversion of the source code or project sources into software artifacts are available for multiple purposes (e.g., preliminary testing, quality assurance (QA), deployment, documentation, and other functions).

The build management system 102 produces target output 104 as a function of user parameters specified by a user or retrieved from another external system via a user interface 106. Target output 104 includes one or more artifacts, including, but not limited to object code resulting from transformation of the source code, executable code, build process documentation, and libraries. Once target output 104 is generated, the build management system 102 is able to utilize the target output 104 for multiple purposes. Consequently, an artifact resulting from the transformation of particular source code can be used for preliminary testing, functional evaluations, more exhaustive quality testing, deployment, and packaging for release, for example.

The user interface 106 provides users with the ability to direct, manage and/or monitor the build management system 102. In one embodiment, the user interface 104 allows users to define certain parameters for living builds and/or software projects. Such parameters can include selection of source code or other artifacts, environment information (e.g., development or QA), or any other suitable elections. User parameters can also include system parameters, based upon available system configuration to generate artifacts, test or deploy target output 104. In some instances, the user interface 104 allows the system 100 to interface with an external system that provides overall coordination of the development effort such as a software planning tool used to establish specific build parameters based on specified triggers or events that occur during the development process.

In one embodiment, users obtain information regarding the progress or status of builds utilizing the user interface 106. In another embodiment, the build management system 102 provides notice to users of certain events (e.g., a failed or unsuccessful activity or warnings encountered during the build process) via the user interface 106. In yet another embodiment, the user interface 106 is a gateway passing messages to an external system such as a project management system. The user interface 106 in various embodiments is implemented as a graphical user interface presented on a computer or accessible via a browser or remote login, text file or any other suitable method or combination of methods for providing data to and receiving notifications and other output from the build management system.

1.a. Pure Build Process

Figure 2:
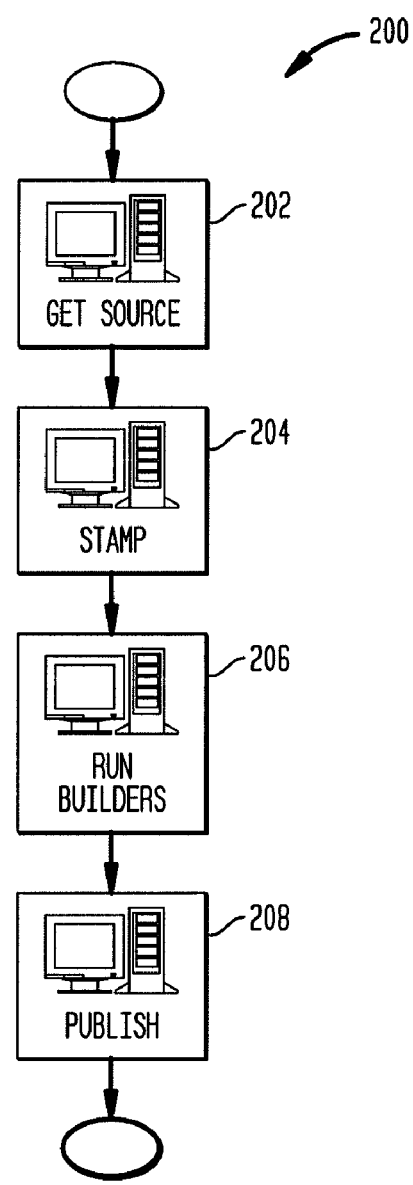
FIG. 2 is a flowchart of an exemplary methodology for a build process.

Referring now to FIG. 2, an exemplary flowchart of a pure build 200 or transformation is depicted. Pure builds 200 are processes that obtain a specified revision level or levels of source code from the source code management (SCM) system as input and transform that source code to produce artifacts. Pure builds 200 do not include any secondary processes such as running unit tests or functional tests or deploying the generated artifacts. Pure builds 200 simply take the source code as input and transform the source into artifacts. The type of transformation depends on the type(s) of source code and the desired environment and purpose for the pure build 200. If the source code is in a compilable language, then the transformation compiles the source code and possibly links and packages it. If the source code is in a non-compilable language, then the transformation simply packages the source code.

Turning once again to FIG. 2, at step 202 the relevant source code is obtained. In one embodiment, the relevant source code is obtained from a source code management (SCM) or other system with comparable functionality including, for example, flat files. The appropriate stamp or build number is applied to uniquely identify the current pure build 200 at step 204. The transformation processes are executed at step 206 using one or more run builders that convert and transform the source code and other source materials obtained. The resulting artifacts of the pure build 200 are published or distributed for the remaining phases of the build process at step 208. For example, if the pure build 200 is part of a nightly build 304, a test suite 314 is run using some or all of the resulting artifacts.

Figure 3:
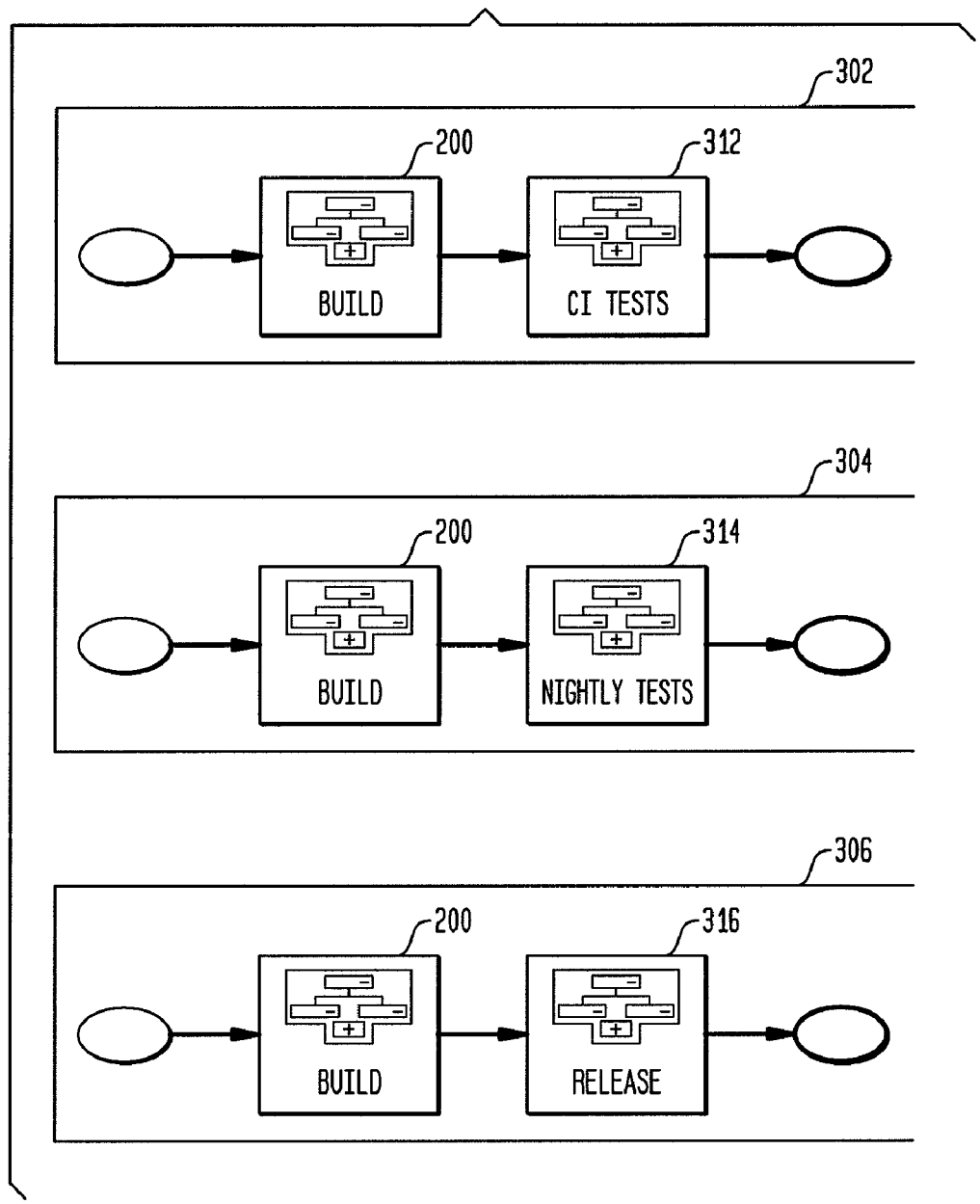
FIG. 3 illustrates exemplary flowcharts of three types of build processes.

FIG. 3 depicts three exemplary build processes with secondary tests appended to the pure build 200. Here, the transformation of the source code that occurs in the pure build 200 depicted in FIG. 2 is only the first phase of the overall build process. Secondary processes act on the artifacts produced by the pure build 200. Secondary processes can run unit tests or functional tests on the artifacts, or can deploy the artifacts to a specified environment, or perform any other automated task using the artifacts. In a second phase of the build process, additional build or tests processes are applied to the artifacts produced by the pure build 200 or transformation to perform the requested build process. These additional processes vary based on the described type of build. The three build processes shown in FIG. 3 are depicted as separate builds for convenience purposes only.

In certain embodiments described herein, continuous integration, nightly, and release builds are treated as different stages of one dynamic or living build rather than defining different types of static builds. Instead of treating a build as a discrete event, the build management system of the present invention is capable of controlling an entire life cycle associated with each snapshot of the project sources. This build life cycle starts with obtaining sources as input and producing artifacts as output, and depending on the demands of the build process and results obtained, progress through various forms of testing, promotion, and deployment; finally, it may conclude with a release of the artifacts into production. What has traditionally been referred to as the "build" is really just the first phase of a living build.

As shown in FIG. 3, a continuous integration build 302 applies one additional process, such as running of an abbreviated test suite, in this case the continuous integration tests or CI tests 312. The system 100 first queues the pure build 200 and then upon obtaining the resulting output files or artifacts, applies the CI tests 312 to these artifacts. In a similar manner, a nightly build 304 applies a different additional process, such as running of the exhaustive test suite or nightly tests 314 to the artifacts created in the pure build 200. Similarly, a release build 306 applies yet another process or set of processes known as a release 316 associated with releasing the artifacts resulting from the pure build 200, such as applying a label and deploying the artifacts to the desired environments. Because the secondary process is always tied to the transformation from source code to artifacts that happens during the creation of the pure build 200, running an additional secondary process in the traditional approach to build management requires an additional pure build 200 process to be completed prior to performing the secondary process, such as the release 316 or the nightly tests 314.

1.b. Living Build Process

Figure 4:
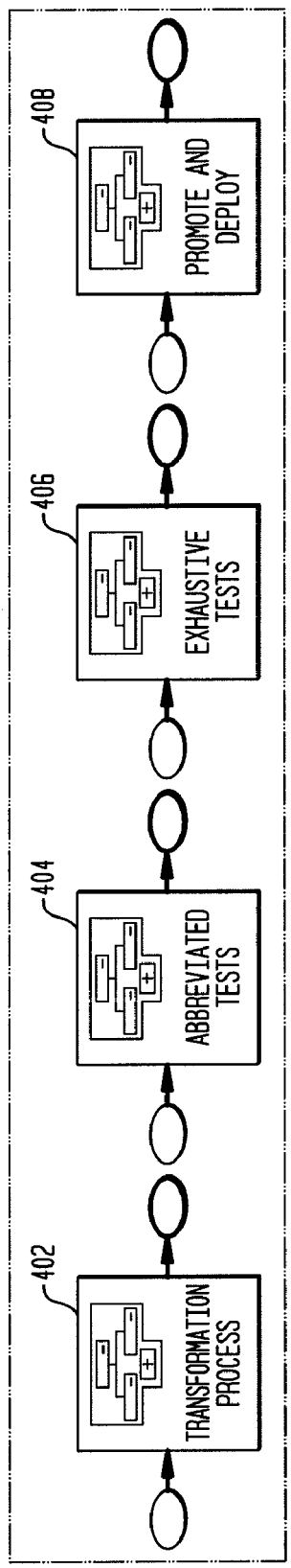
FIG. 4 is a flowchart of phases of an exemplary living build in accordance with an aspect of the subject matter described herein.

FIG. 4 depicts an exemplary block diagram of multiple phases of a living build as implemented in a build management system 102. Builds transform project source files, as such those source files that exist at a particular point in time, into artifacts, sometimes referred to as derived objects. Once the build artifacts are available, the build management system 102 is able to repurpose or utilize the artifacts for other purposes such as running additional tests, deploying, packaging for release, etc. In this manner derived objects from a given build process are able to be repurposed for a number of different tests, so a common set of derived objects is usable in multiple tests, such as both a nightly test 314 and a continuous integration test 312.

In one embodiment, the build management system 102 separates the transformation process 402 used to produce the artifacts from additional processes that are applied to those artifacts. All of these pieces, the transformation 402, as well as, all the additional processes, are then selectably linked together as required via the living build. Therefore, rather than having a continuous integration build 302, the build management system 102 has an "abbreviated tests" 404 phase of a living build. In addition, rather than having a nightly build 304, the build management system 102 has an "exhaustive test" 406 phase of a living build. Furthermore, rather than having a separate release build type 306, the build management system 102 has a "promote and deploy" 408 phase of a living build. In each case, the initial transformation of sources into artifacts is performed only once per living build. Once the living build artifacts are available, additional processes may be performed on them. By using a living build, there is a guarantee that the artifacts tested during the continuous integration build 302 are the exact same artifacts tested during the exhaustive testing phase and are the exact same artifacts later deployed into QA or production. Further, there is a guarantee that the exact same sources were used to produce the artifacts at each phase of the software build process.

In one embodiment, the living builds implemented by the build management system 102 provide traceability of artifacts from the transformation 402 (also known as the pure build 200) processes that produce the artifacts to the secondary processes that act on, test and evaluate the artifacts. A living build starts with a single pure build 200 or transformation process 402 that produces artifacts. Those artifacts are then associated with that specific instance of the living build. As secondary processes are run on that living build, the secondary processes implicitly use the artifacts associated with that living build, thus providing the traceability. A living build can have an unlimited number of secondary processes after a pure build 200 or transformation process 402, but a single instance of a living build is limited to a single transformation process 402, which must be generated first. The living build tracks and manages the secondary processes that are applied to the result of the transformation process 402 associated with that instance of the living build.

One exception to this general rule occurs when a living build is archived. When a living build is archived, all of its artifacts are deleted to save space. Later, the living build may be unarchived, during which the transformation process 402 will be executed again on that living build in order to recreate the artifacts.

The living build approach guarantees that the same exact artifacts are being used for each additional process (abbreviated test suite 404, exhaustive test suite 406, release and deploy 408, etc.). Since the same exact artifacts are being used, there is a guarantee that the same exact sources were used to generate those artifacts. This reuse of artifacts ensures consistency. As discussed above, each build is independent in traditional build processing. During software development, source code is constantly modified and updated. Even builds created on the same day are likely to have been generated based upon different versions of source code, resulting in differences between the builds. The living build approach allows users to model the development and build lifecycle of the software and trace a version of the software as it travels through the lifecycle. The use of multiple living builds allows a user to move forward and backward across multiple software versions and apply different evaluation metrics to different living builds to change that current lifecycle status of that version of the code for tracking dependencies and changes across multiple versions of the software.

Using the build management system 102 with living build-based management also reduces the storage requirements. In conventional build systems, each build generates separate object code or artifacts. Consequently, conventional builds generated based upon identical source code results in storage of duplicate artifacts. A build management system 102 using a living build paradigm reuses generated artifacts for multiple purposes, reducing the overall storage requirements.

The living build approach is the paradigm for builds that is used in embodiments of the build management system 102. Without the living build methodology, if a developer wanted to apply a new additional process, the developer must configure a new build type and then execute the new build type to create a new build. The new build would first recreate its own artifacts before applying the new additional process to those artifacts. With the living build approach, if a developer wants to apply a new process, all that is necessary is to define the new process, and apply it to any existing living build. There is no need to execute new builds. The traditional view of builds is a static and discrete, where each build has a definite start and end point. In stark contrast, the living build model is dynamic, with each living build beginning with a transformation of the project sources into one or more artifacts, with no limit to the additional or secondary processes that can be applied to a living build.

Figure 5:
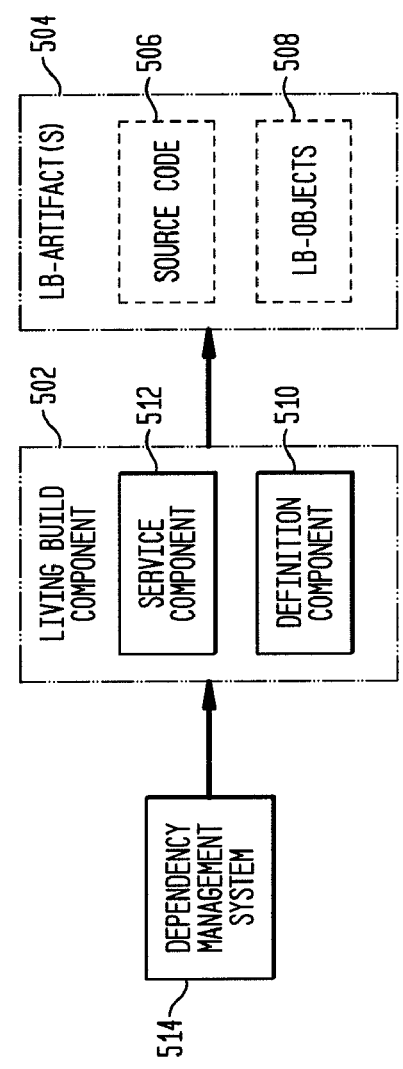
FIG. 5 is a block diagram of an exemplary build management system in accordance with an aspect of the subject matter described herein.

Turning now to FIG. 5, an exemplary build management system 102 is depicted. In one embodiment, the build management system 102 includes a living build component 502 responsible for the generation of LB-artifacts 504. The term "LB-artifacts" 504 includes both build source code 506 from which the executable software is generated, as well as, LB-objects 508. As used herein, the term "LB-object" 508 refers to program objects as well as other objects such as, but not limited to, test results, documentation, messages, and other details generated by the living build process via the living build component 502. Once a living build has LB-objects 508, other phases of the living build can act on and use those certain LB-artifacts 504 and LB-objects 508. For example, certain LB-artifacts 504 may go through a build verification phase, or a phase that deploys those certain artifacts to the development environment, or a phase that deploys the artifacts to the QA environment, or to production.

The living build component 502 includes a definition component 510 that contains configuration information regarding projects, living builds, processes and other information necessary or relevant to the management of living builds. In one embodiment, users update the configuration information maintained by the definition component via the user interface 106. In still other embodiments, the definition component 510 receives updates via the user interface 106 from an external software project management server. Details of the definition component 510 are transferred into and packaged with the LB-artifacts 504 for dependency tracking.

The living build component 502 also includes a service component 512 that directs the execution of build processes in accordance with the configuration maintained by the definition component 510. In one embodiment, the build management system 502 is used in conjunction with a dependency management system (DMS) 514. The DMS 514 manages dependency in source code, tracking the relationships of multiple interdependent subsystems, components, or modules of code.

2. Implementing Living Builds

In one embodiment, a configuration for the build, and a set of process definitions that are applied to the build, are used to generate a living build. Typically, the living build configuration defines the project, the sources that are to be used for the build, and the details of the LB-artifacts 504 produced by the build via the living build component 502.

The process definitions specify a set of steps that are to be executed when the process is executed on the living build via the living build component 502. When a process definition is executed, it produces a process instance that is used to capture the execution details and status.

Figure 6:
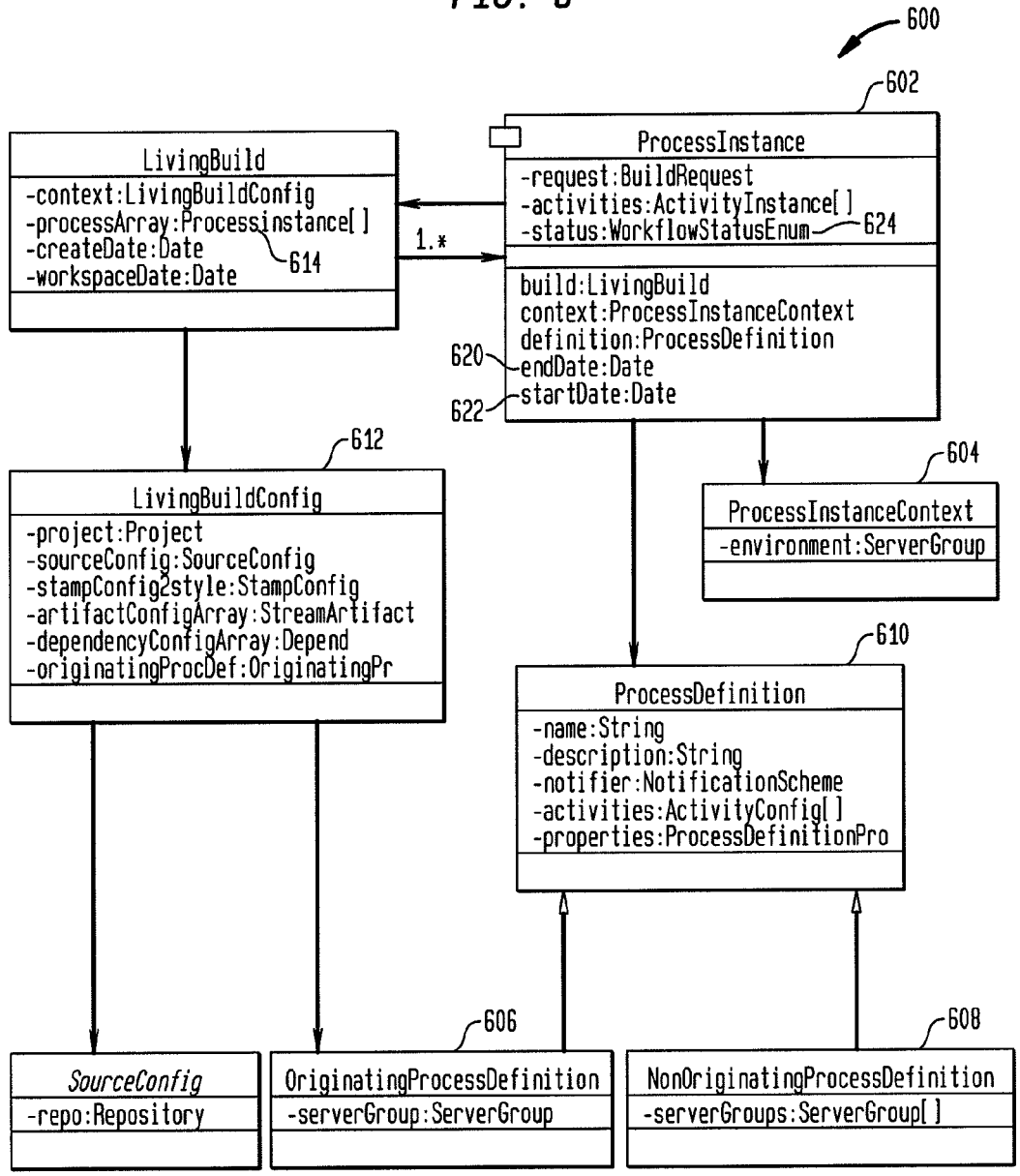
FIG. 6 is an example of an exemplary build originating process definition.

Referring now to FIG. 6, an exemplary diagram of a living build 614 originating process definition 600 is illustrated. The originating process definition is a particular type of process definition. An originating process definition is run on every living build 614 as the first process on that build by the service component 512 of the living build component 502. Only a single originating process definition is executed on a given living build 614. Following the execution of an originating process definition during a build, any number of non-originating process definitions can then be subsequently executed on the living build 614.

The originating process definition 600 specifies the steps that are used to transform the source code into the build artifacts. To have traceability between resulting artifacts and the source code that was used to produce them, only a single originating process definition 600 instance is allowed with any particular living build 614. The originating process definition 600 in one embodiment is made up of the following major steps: get source code, assign unique build number, build source code, and deliver artifacts. It is apparent to one of ordinary skill in the art that many variations and deviations from this originating process definition 600 are possible, particularly when distributed builds are supported.

Referring again to FIG. 6, the originating process definition 600 is executed and used to initialize a particular living build 614 by the service component 512. The originating process definition 600 is used to produce a process instance 602 and requires a process context 604 to enable process execution by the service component 512. The process instance 604 is used to index the dataset that includes process definitions 610 and living build 612 configuration details necessary to define and manage the living build process through the service component 512. The process instance context 604 in some instances contains additional data used during the execution of the process by the service component 512, thus allowing the process to be further templated and applied to multiple situations. In distributed build situations, an embodiment of the additional data includes the server group 608 on which the process instance is to run, thus allowing the same process definition to be used on multiple different server groups 608.

A single living build 614 represents a single transformation of source code to artifacts for a snapshot of the sources as they existed at a specified point in time, along with additional processes applied to the intermediate and final artifacts. As such, each living build 614 identifies the snapshot of sources that were used in the originating process. This snapshot captures the sources used in the production of the artifacts to allow traceability from LB-artifacts 504 back through the process origination definition 600 and the source files used by the service component 512.

In the embodiment shown, each process instance 602 captures the start date 622 for the execution of the process along with the end date 620. Further, each process instance 602 captures the current state or process status 624 of the process execution—e.g. queued, running, failed, or completed. In some embodiments, the process instance 602 captures additional detailed information about the process execution. For instance, if the process definition 610 is made up of process step definitions that get executed, then the process instance 602 includes a sequence of process step instances 610, in the process definition, each of which correspond to an execution of a step definition.

2. a. Build Service

Figure 7:
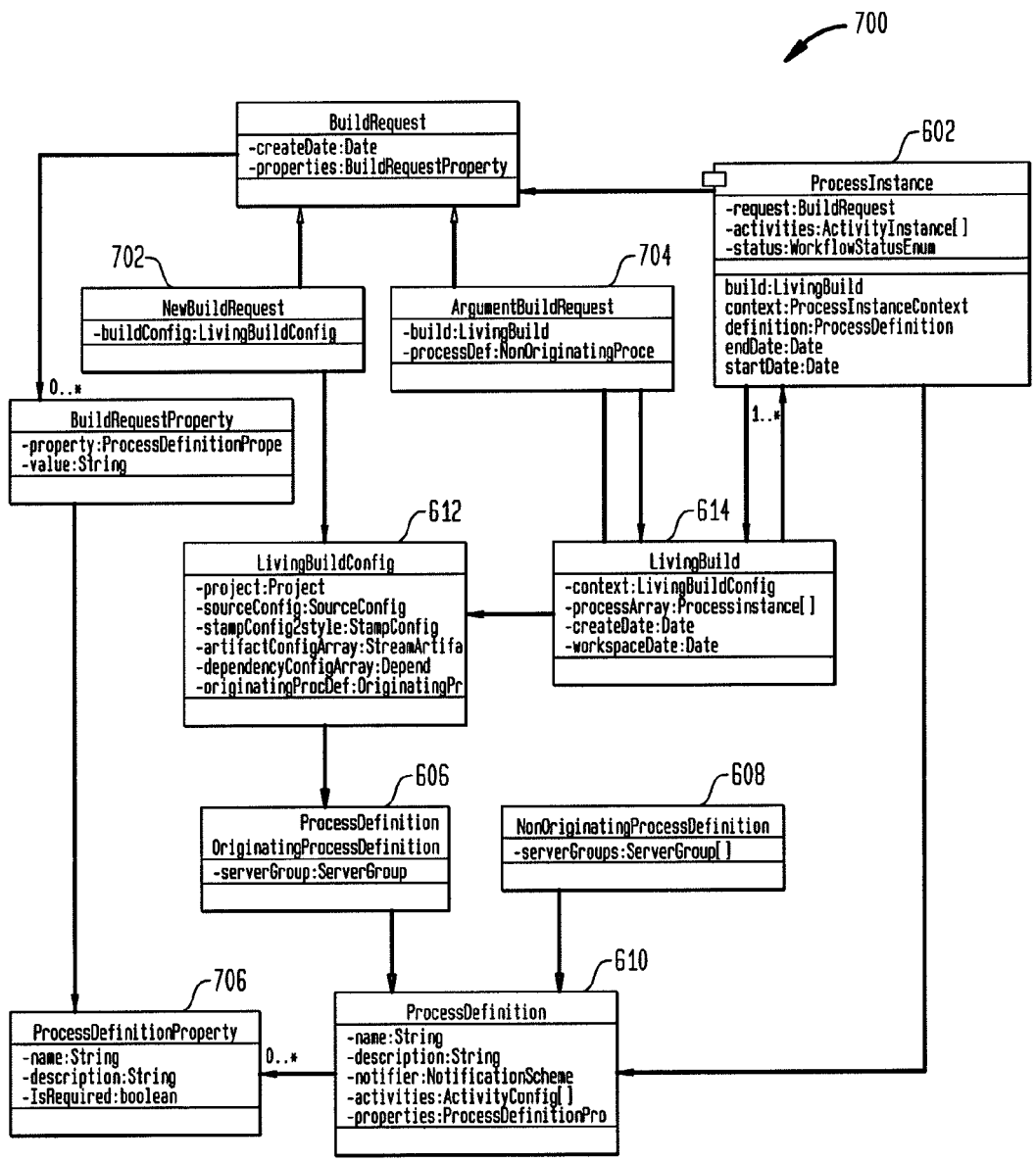
FIG. 7 is an exemplary flowchart depicting the build service process

FIG. 7 is an exemplary flowchart depicting the build service process 700. At runtime, the service component 512 uses the build service process 700 to execute an originating process definition 600 with a specified process instance context 604 and a specified living build 614. When creating a new living build 614, this build service process 700 needs to know the living build configuration 612 for the build life especially the source and artifact configurations; as well as the originating process definition to execute. The service component 512 first creates the living build instance. The service component 512 then executes the originating process definition 600 on that living build 614 to initialize that instance of the living build 614 and begin the configuration process.

The build service process 700 is responsible for creating new living builds 614 and executing process definitions 610 on them. There are two types of requests that the service component 512 handles via the build service process 700: (1) a request to create a new living build, and (2) a request to execute a specified non-originating process definition 608 on an existing living build 614.

A NewBuildRequest 702 contains a reference to a LivingBuildConfig or living build configuration 612 object and thus is aware of which OriginatingProcessDefinition 606 is to be used. The service component 512, when executing a NewBuildRequest 702 creates a new instance of a living build 614 based on the LivingBuildConfig 612 referenced by the NewBuildRequest 702. The service component 512 then executes the OriginatingProcessDefinition 606 to create a resulting ProcessInstance or process instance 602 object. Each ProcessInstance 602 object has a reference to the BuildRequest 706 which caused that instance to be created by the service process 512.

An AugmentBuildRequest 704 is used to request that a ProcessDefinition 610 be executed on an existing living build 614. An AugmentBuildRequest 704 contains a reference to an existing living build 614 as well as a reference to a NonOriginatingProcessDefinition 608. When the service component 512 executes the requested ProcessDefinition 610 on the requested instance of a living build, it creates a new ProcessInstance 602 which contains a reference to the BuildRequest 704 in response to which it was created.

2. b. Project

Figure 8:
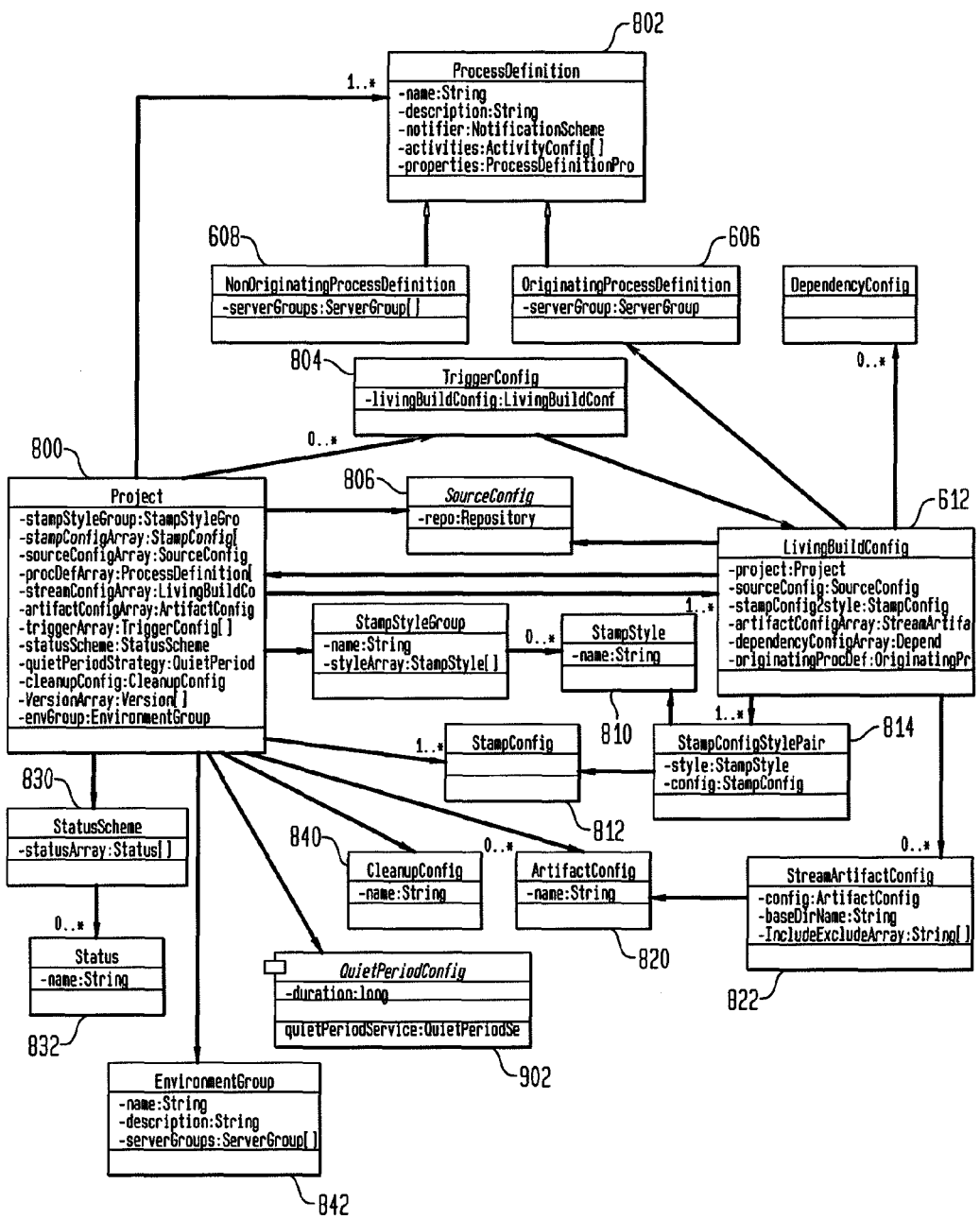
FIG. 8 is an example of a project class diagram.

Referring now to FIG. 8, an exemplary block diagram of the Unified Modeling Language (UML) class diagram of a project 800 is illustrated. The project 800 is a container for most of the configuration of what happens during any phase of a build life process ranging from the transformation 402 process through the promote and deploy 408 process. The project 800 in one embodiment corresponds to a project defined within the Source Code Management (SCM) or source code repository system. In other embodiments there is no direct association between a project 800 and projects as defined within the SCM. In either embodiment, the project 800 definition includes a definition of all source code used as input, all the processes used in the transformation 402 process that converts the source code into LB-artifacts 504, as well as, all the processes that act on the artifacts in subsequent phases of the living build 614. In this sense, the project 800 corresponds to a unit of source code that has its own lifecycle, meaning that it is modified and released on its own lifecycle independently from the lifecycle of other pieces of source code (although it may incorporate other instances of projects 800 via dependencies).

Project 800 includes an array of ProcessDefinition 802 objects. The ProcessDefinition 802 objects come in one of two subclasses: OriginatingProcessDefinition(s) 606 that are used to create new instances of living builds 614, and Non-OriginatingProcessDefinition(s) 608 that define the process for subsequent phases on a living build 614. The details of a ProcessDefinition 802 are discussed below. The project 800 knows about all the ProcessDefinition(s) 802 that act on any instance of a living build 614 for that project 800. This means that the ProcessDefinition(s) 802 for one project 800 are distinct and separate from the ProcessDefinition(s) 802 for another project 800.

TriggerConfig 804 objects allow a user to configure how new living build 614 instances come into existence based on external events or triggers. In one embodiment, there are two types of external events supported: (1) schedule based events, generated by a schedule service, and (2) SCM commit events generated by the Source Configuration Management tool every time a user commits a change to source code that is used by the project 800. The trigger functionality is very closely tied to the quiet period service 900, described in detail below. Each TriggerConfig 804 object is associated with a LivingBuildConfig 612 object; the trigger causes a new instance of a living build 614 for the LivingBuildConfig 612 that it knows about to be created.

A project 800 has potentially multiple SourceConfig 806 object references. Each SourceConfig 806 object defines the source code used as input into the particular instance of the living build 614 that the project 800 is associated. In some instances, a project 800 may have multiple SourceConfig 806 references to allow for different branches or streams within the SCM. Each branch or stream within the SCM corresponds to a different SourceConfig 806 object within the project 800. The fact that a project 800 configuration is applicable for multiple different streams or branches within the SCM is a key point that shapes important parts of the project 800 class definition. The LivingBuildConfig 612 objects provide the configuration details for a specific SourceConfig 806 object, meaning that each LivingBuildConfig 612 object defines the configuration for a specific stream or branch in the SCM. In some embodiments, the object model (class diagram) is simplified if the relationship between project 800 and SourceConfig 806 is of a single cardinality. In that case, there would not be a need for the LivingBuildConfig 612 class since the project 800 class takes its place and subsumes it. In the embodiments where the relationship between project 800 and SourceConfig 806 is one too many, the user is provided additional flexibility to allow the user to access the streams or branches that exist on that project 800 within the SCM. Described in the alternative, if the relationship between an instance of project 800 and an instance of SourceConfig 806 is one to one, all the process definitions 802 defined for one project 800 must be recreated on another project 800 corresponding to a each different stream or branch within the SCM.

In the embodiment depicted in FIG. 8, a stamp is provided to enable a user friendly identifier to be applied for each instance of a living build 614. In some instances the stamp applied to an instance of a living build 614 is essentially a build number. In other embodiments, an additional concept of a stamp and stamp style 810 are used to capture the fact that a single instance of a living build 614 will proceed through multiple phases during its lifetime and thus is exposed to multiple people and multiple groups of people. For example, an instance of a living build 614 may start out as a development build. In this case, the developers may need to know the build number, (e.g., DEV-1, DEV-2). Once in a while, a development build may get released to the Quality Assurance (QA) group. For example, builds DEV-10 and DEV-15 get released to the QA group which prefers to have sequential identifiers such as QA-1 and QA-2 instead of DEV-10 and DEV-15. This is where the concept of a stamp style(s) 810 and stamp config(s) 812 definitions are used by the service component 512. Users can define two instances of the StampStyle(s) 810 for the project 800 0—e.g. "DEV" for development and "QA" for Quality Assurance. But the StampStyle(s) 810 does not actually provide the stamp; the instance of the StampConfig(s) 812 embeds the knowledge of how to provide the stamp. The project 800 in this embodiment for the given example defines two StampConfig(s) 812, a TRUNK-DEV instance that produces stamps such as DEV-1, DEV-2, etc., and a TRUNK-QA instance that will produce stamps such as QA-1, QA-2, etc. Users can then use the StampConfigStylePair 814 to associate the TRUNK-DEV StampConfig 812 with the DEV StampStyle 810 and the TRUNK-QA StampConfig 812 with the QA StampStyle 810. In this manner, down stream users are able to track the living build 614 through multiple releases of the LA-Artifacts 504 through various downstream tests using various management tools without loss of generality or traceability.

The separation between StampStyle 810 and StampConfig 812 is used by embodiments that support streams and branches supported within a project 800. The StampStyle(s) 810 are concepts that cross the SourceConfig 812 boundaries and are applicable to each stream or branch found in the SCM and referenced by the multiple SourceConfig(s) 806. The StampConfig 812 also allows a user to apply different build numbers (or stamps) on different streams (or branches). The user can define a different StampConfig 812 for each StampStyle 810 and each stream. Thus, if an instance of a project 800 has two StampStyle(s) 810 and two SourceConfigs 812, the project 800 may end up with four StampConfig(s) 812. Each StampConfig 812 in turn corresponds to a specific StampStyle 810 and SourceConfig 812 combination.

In yet another embodiment of the project 800 definition example shown in FIG. 8, the pairing of StampConfig 812 to a StampStyle 810 and SourceConfig 812 is accomplished in the LivingBuildConfig 612 via the StampConfigStylePair 814 class. Each LivingBuildConfig 612 is associated with a single SourceConfig 812. Also, each LivingBuildConfig 612 has an array of StampConfigStylePair 814 objects wherein each entry in the array corresponds to one StampStyle 810 defined in the project 800. And every StampStyle 810 object in the project 800 is represented by a StampConfigStylePair 814 object in the LivingBuildConfig 612 object. The StampConfigStylePair 814 object then associates a StampConfig 806 with a StampStyle 810 in that StampConfigStylePair 814 and thus the LivingBuildConfig 612 holds the association between the StampConfig(s) 810 and a particular SourceConfig 806 (the one associated with the LivingBuildConfig 612) and each of the StampStyle(s) 810 in the project 800.

The instance of the ArtifactConfig 820 shown in the embodiment of the project 800 depicted in FIG. 8 is a reference to an artifact repository. A build of any instance of a project 800 typically produces a number of LB-artifacts 504. These LB-artifacts 504 are grouped into artifact configurations using the ArtifactConfig 820. The artifact configurations correspond to the intended use of the LB-artifacts 504 within the Artifact Configuration. For example, a build of an instance of a project 800 in one instance produces a JAR file containing reusable classes as an LB-artifact 504 along with a JAR file containing unit tests. These two artifacts are placed into two separate artifact configurations. In one embodiment, the JAR file with reusable code is placed into an artifact configuration called Default, and the JAR file with unit tests is placed into a configuration named Tests. The ArtifactConfig 820 provides the user with flexibility categorize and label LB-artifacts 504 into desired an artifact configuration taxonomy.

The embodiment of the project 800 depicted in FIG. 8 holds an array of ArtifactConfig 820 objects. An ArtifactConfig 820 object is simply an identifier. The actual configuration of what artifacts belong to what ArtifactConfig 820 is specified separately for each LivingBuildConfig 612 in the StreamArtifactConfig 822 objects. There is one StreamArtifactConfig 822 object in the LivingBuildConfig 612 for each ArtifactConfig 820 object in the project 800. The StreamArtifactConfig 822 specifies what files in the working directory used for the build should be placed in the ArtifactConfig 820 related to the StreamArtifactConfig 822. The effect of the StreamArtifactConfig 822 is to configure a file filter that identifies a directory to search (i.e. the base directory) and with a set of terms for determining the inclusion and exclusion patterns for file names. The service component 512 operating on the instance of the project 800 thus uses the inclusion and exclusion patterns to locate files within the base directory and add all such files as artifacts of the build belonging to that specific ArtifactConfig 820. The inclusion and exclusion rules in some instances are wild card characters such as '*', '?', and '**/*'. The character '*' will match a variable length sequence of arbitrary characters. The character '?' matches a single arbitrary character. And the string '**/*' recurses through all the subdirectories of the base directory.

In the embodiment depicted in FIG. 8, the instance of project 800 also includes StatusSchemes 830 that allow users to create state diagrams for modeling the different states that a living build 614 may assume. Each Status 832 corresponds to a state in the state diagram. The StatusScheme 830 corresponds to the set of states in the state diagram. Statuses are then associated with instances of living builds 614.

2.b.i Quiet Period Configuration

Figure 9:
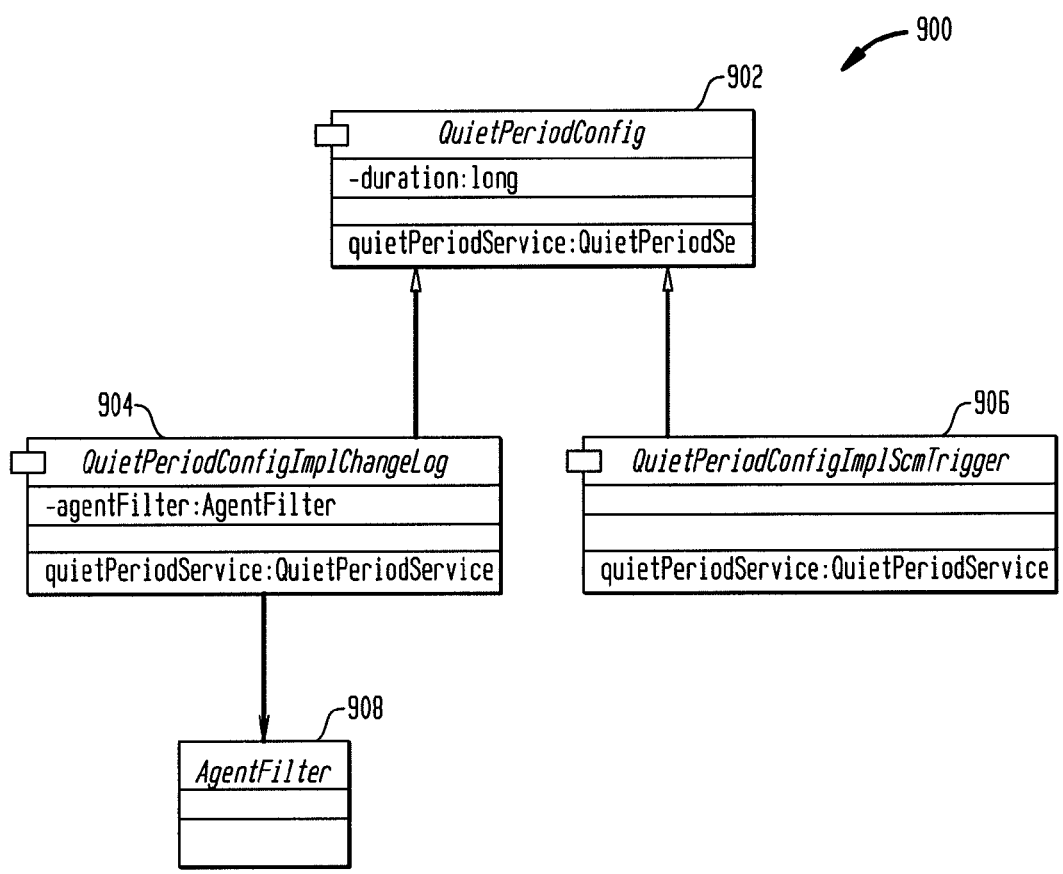
FIG. 9 depicts an exemplary process flow for the quiet period service.

FIG. 9 depicts an exemplary process flow for the quiet period service 900. The QuietPeriodConfig 902 provides the configuration for the quiet period service 900 associated with the project 800. The QuietPeriodConfig 902 includes the duration of the quiet period, meaning the length of time since the last commit that the quiet period service 900 must wait before starting a build. The QuietPeriodConfig 902 also returns a reference to the quiet period service 900 that is to be used for this project 800.

There are two types of QuietPeriodConfigs 902 in the depicted embodiment: one based upon the ChangeLog 904 and the another based upon the SCM Trigger 906. The ChangeLog 904 based quiet period service runs on a defined schedule and periodically obtains a change log for the project from the SCM (Software Configuration Management System) and determines whether the quiet period duration has passed based on the change log. If there have been changes (commits) since the start of the quiet period then the quiet period must be restarted at the time of the most recent commit. The Change Log 904 based QuietPeriodConfig 902 utilizes an AgentFilter 908 to determine where to run the job to get and parse the ChangeLog 904.

The SCM Trigger 906 based quiet period service 900 uses SCM notifications to determine when the quiet period duration has passed for a particular living build configuration. If this SCM Trigger 906 service receives notification of a commit, it checks whether a quiet period is already running for the living build configuration corresponding to the commit. If one is running, it gets reset. If one is not running, then one is started. Once the quiet period duration expires (after being potentially reset multiple times by incoming notifications), then the quiet period has passed and the requested build may continue.

2.b.ii Cleanup and Removal of Living Builds Instances

In one embodiment, the CleanupConfig 840 object is responsible for determining when and what instances of living builds 614 are to be deleted and on what schedule. The clean up configuration 840 is done by using information contained within the Status 832 instance and then by either the age of the instance of the living build 614 in that Status 832 or by the total number of living builds 614 to be kept for that Status 832. In one exemplary instance, one clean-up configuration 840 keeps all failed builds for one day, and all successful builds are kept for ever. In an alternative instance, the clean-up configuration 840 retains five failed builds (i.e. the latest five failed builds) while all successful builds are kept forever. The CleanupConfig 840 object is used by the service component 512 to determine when to remove and purge or archive a given instance of a living build 614 from the system 100.

2.c. Process Definition

Figure 10:
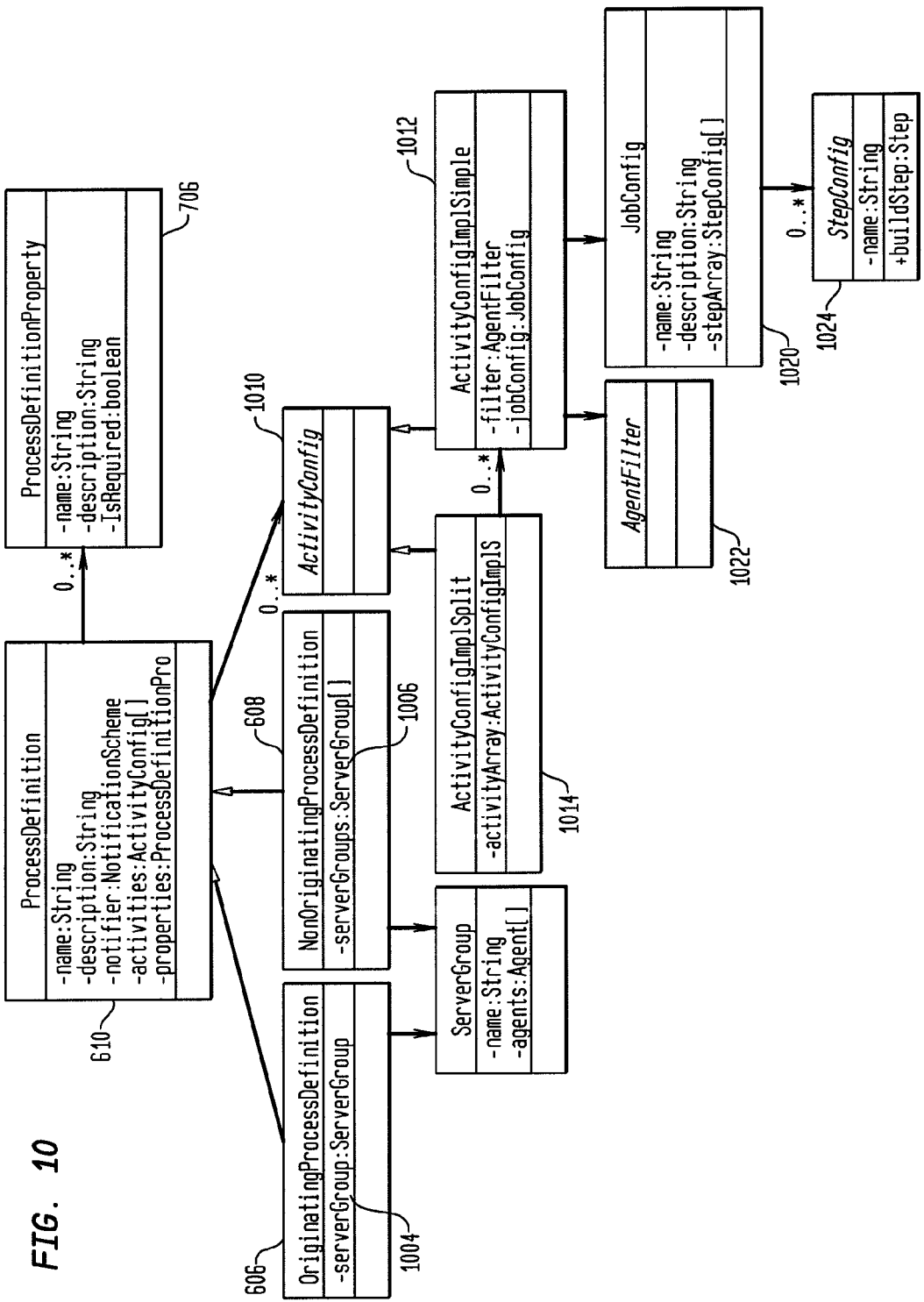
FIG. 10 depicts an exemplary process definition configuration time workflow.

Referring now to FIG. 10, a diagram of an exemplary process definition configuration time workflow for one embodiment is illustrated. The ProcessDefinition 610 defines the workflows that are executed by the embedded workflow engine within the service component 512 to accomplish tasks such as build a project 800, test the project 800, promote the project 800, or deploy it. In one instance, there are three separate views of the workflow system: (1) a configuration time view, (2) a run-time view, and (3) an archive view.

FIG. 10 illustrates the major details of the configuration time view of the workflow. At configuration time, a user constructs ProcessDefinition 610 and related objects—e.g., ProcessDefinitionProperty 706. As previously discussed, an instance of a ProcessDefinition 610 may be one of two types: an OriginatingProcessDefinition 606, and a NonOriginatingProcessDefinition 608. A single instance of a living build 614 has the restriction that it can have a single OriginatingProcessDefinition 606, and it can have any number of NonOriginatingProcessDefinitions 608. An OriginatingProcessDefinition 606 is associated with exactly one ServerGroup 1004. This is required in case there is a dependency relationship and one project needs to kick off an OriginatingProcessDefinition 606 of another project; in that case the system 100 needs to know the exact server group 1004 that is to be used for the kicked off OriginatingProcessDefinition 606 instance. The NonOriginatingProcessDefinition 608 may be associated with multiple ServerGroups 1006 with the restriction that all these ServerGroups 1006 must be within the EnvironmentGroup 842 associated with the project 800 for the ProcessDefinition 610. The ServerGroups 1006 that are associated with the NonOriginatingProcessDefinition 608 will be the ones that this process can run on. In this manner, this embodiment enables the user to distribute build processes and test procedures across multiple physical servers each running at least one unique service component 512 that is subservient to the ServerGroup 1004.

In the exemplary embodiment, both types of ProcessDefinitions 610, Originating 606 and NonOriginating 608, are comprised of a list (or array) of ActivityConfig 1010 objects. ActivityConfig 1010 objects represent activities in the workflow (the process).

There are two types of ActivityConfig 1010 classes: an ActivityConfigImplSimple 1012 and an ActivityConfigImplSplit 1014. The simple activity configuration 1012 specifies the JobConfig 1020 that is to be executed by this workflow activity along with an AgentFilter 1022 that is to be used at run-time to select an agent on which the specified JobConfig 1020 should be executed. The split activity configuration 1014 creates a split in the workflow and allows multiple simple activity configurations to be run concurrently (in separate threads).

A JobConfig 1020 provides the configuration for a job in this exemplary embodiment of the system 100. Jobs 1224 are the largest concepts that are assigned to individual agents to be run because an activity or process could be told to run multiple instances of itself concurrently on multiple agents. Thus an activity in some instances corresponds to multiple agents. A job 1224, however, is associated with a single agent. Underneath, a JobConfig 1020 is a series of StepConfig 1024 objects.

Figure 11:
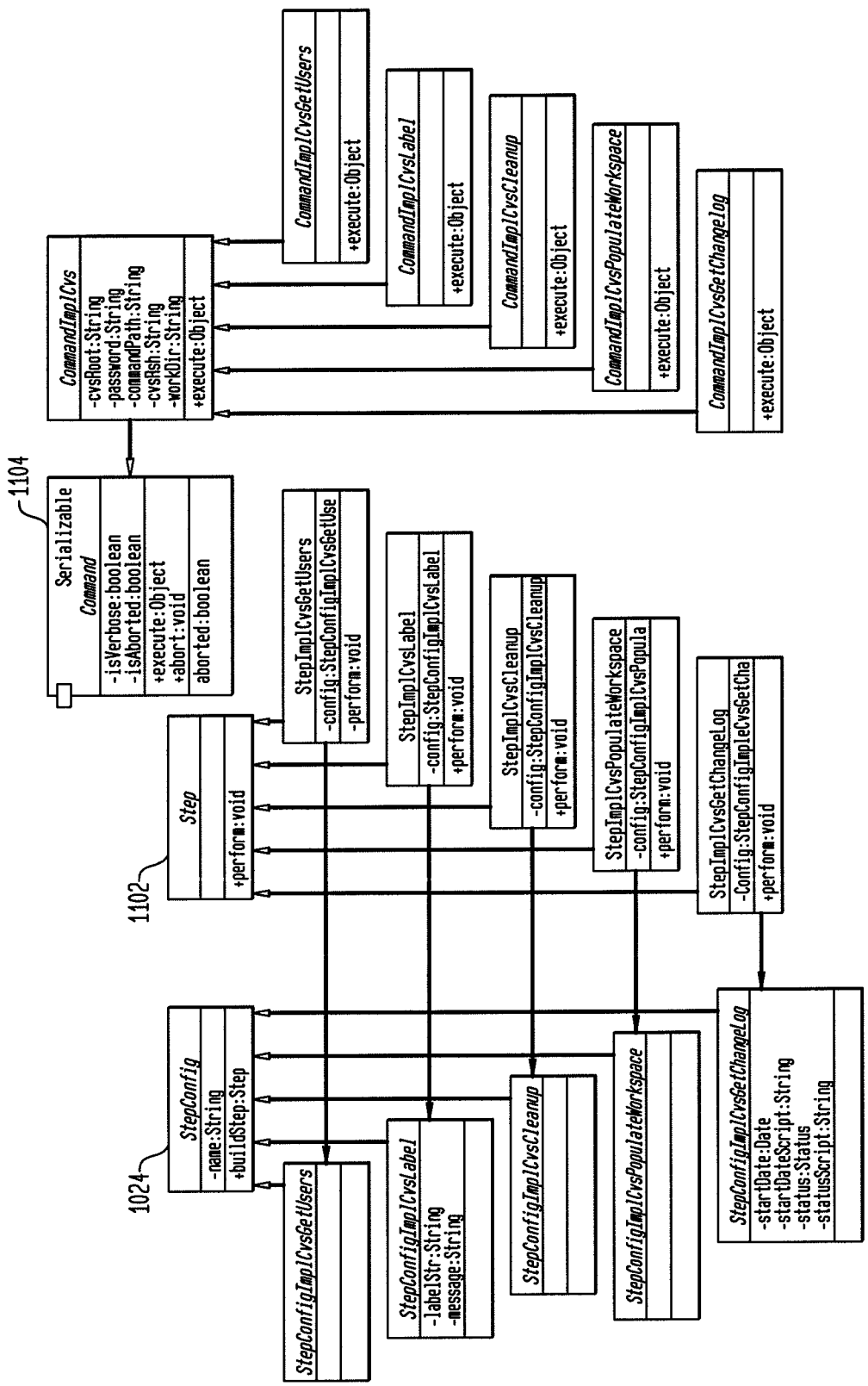
FIG. 11 details an exemplary block diagram of the step configuration process.

Turning now to FIG. 11, an exemplary block diagram of the step configuration process is illustrated. In the embodiment depicted, there are many different subclasses of StepConfig 1024. Each subclass of StepConfig 1024 is used to specify the configuration of the corresponding step. The StepConfig 1024 classes are used at configuration time and are persisted to secondary storage such as a database. The Step 1102 classes are used at run-time. The service component 512 uses the StepConfig 1024 objects to produce the corresponding Step 1102 objects and in that way act as object factories for the Step 1102 objects at run-time. The Step 1102 objects create instances of Command 1104 objects and send those objects to the agents for execution. The agents execute Command 1104 objects that are serialized and sent to them. Serializing the Command 1104 objects ensures that the agent receives a series of commands for execution whereby each particular Command 1104 proceeds a later Command 1104 and follows a proceeding Command 1104 which allows the agent to execute the commands sequentially. The Step 1102 objects are used to Command 1104 objects because Command 1104 objects provide a unit of reuse that are composed to provide varying functionality and are adapted for serialization to produce complicated agent behavior beyond the scope of a singular Command 1104. This serialization and construction of complicated agent behavior Commands 1104 is why the Step 1102 layer exists—namely because some steps require the execution of multiple Command 1104 objects serially.

Figure 12:
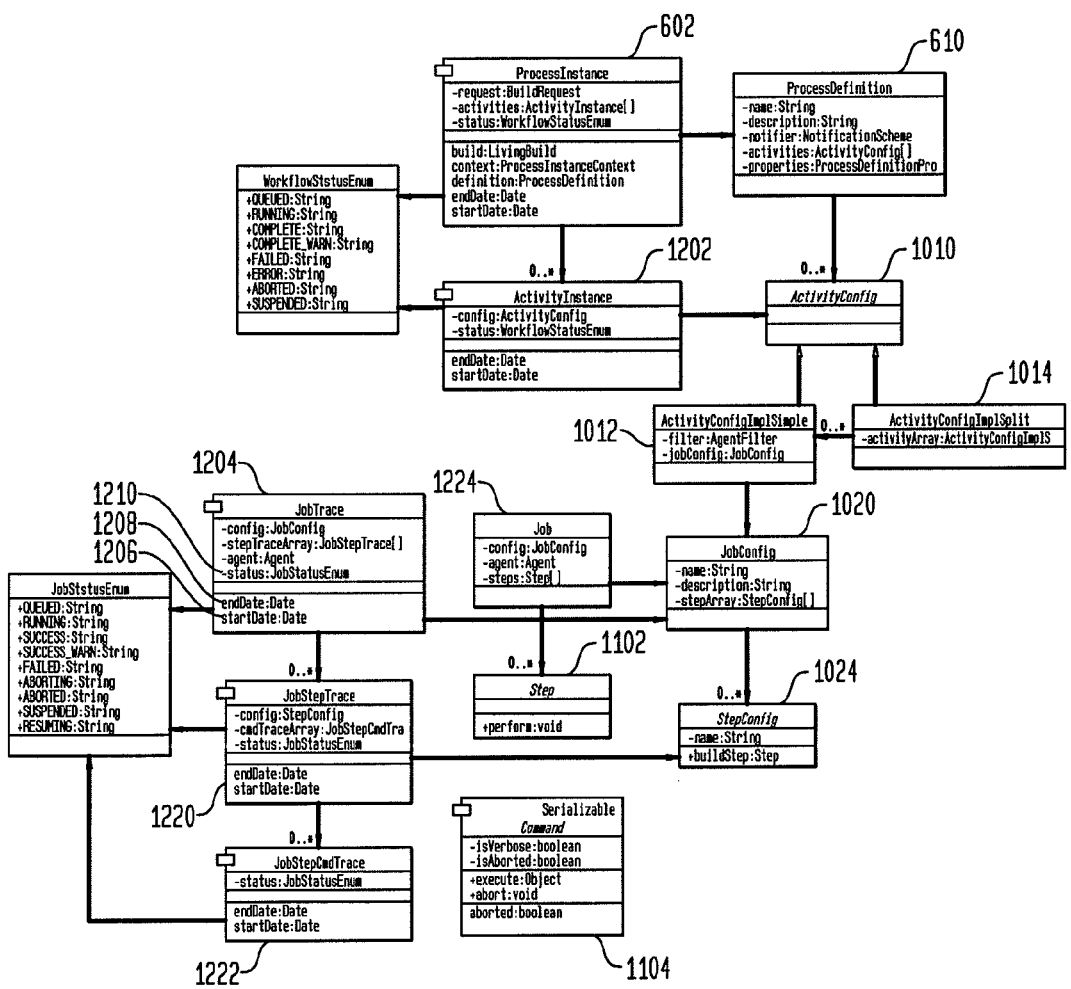
FIG. 12 is an exemplary block diagram of a job configuration process.

Turning now to FIG. 12, an exemplary block diagram of the job configuration process is illustrated. This third view of an embodiment of the workflow and related objects illustrates the manner in which information about a single execution of a workflow, and activities, and jobs, and steps, and commands, is stored in a database for use by the service component 512 and provides traceability through a given instance of a living build 614. For the ProcessDefinition 610 and ActivityConfig 1010, it is the ProcessInstance 602 and ActivityInstance 1202 that provides the run-time view as well as the archived view of the execution of an instance of the living build process. When it comes to the JobConfig 1020 though, there is a Job 1224 object that is used at run-time to execute the Job 1224, and there is a JobTrace 1204 object that is used to store information about the Job 1224 execution. The JobTrace object 1204 stores the start time 1206 and end time 1208 of the Job 1224 as well as its current status 1210. The JobTrace 1204 has a collection of JobStepTrace 1220 objects that are used to archive the status of a Step 1102 execution. The JobStepTrace 1220 objects have in turn a collection of JobStepCmdTrace 1222 objects that are used to archive the status of a Command 1104 execution.

2.d. Environment Groups, Server Groups, Agents, and Agent Filters

Figure 13:
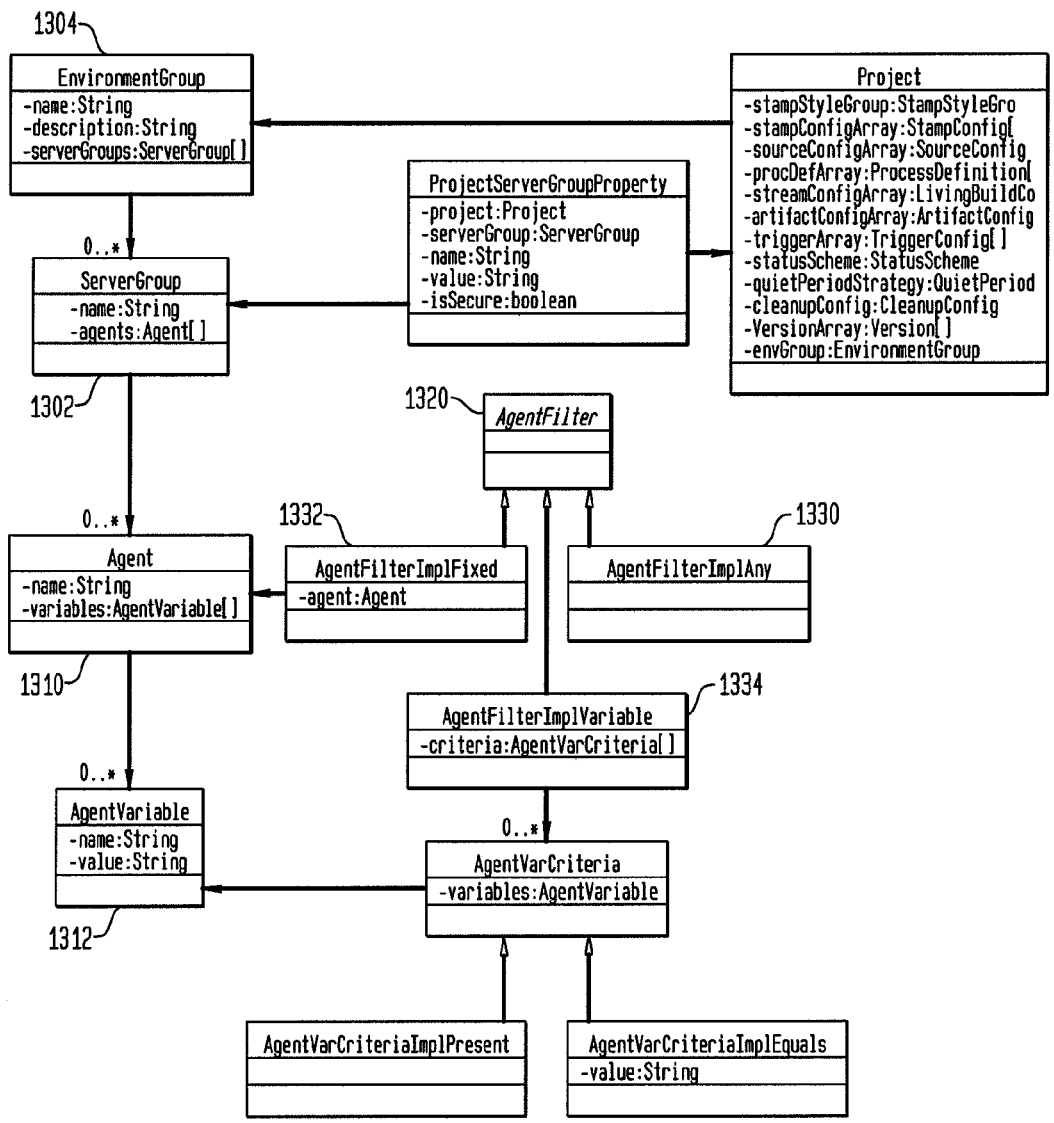
FIG. 13 provides an example of a block diagram for assigning agents to server groups.

FIG. 13 provides a block diagram of overview of an embodiment of the system 100 for assigning agents to server groups. An environment groups comprises one or more sets of ServerGroup 1302 objects. Each instance of an EnvironmentGroup 1304 is adapted to contain one or more Server Groups 1302. In the present embodiment, each ServerGroup 1302 object is used to model an environment such as a Development Environment, a QA Environment, a Production Environment, etc.

The EnvironmentGroup 1304 objects are associated with instances of projects 800 and operate via the service component 512 to establish the server groups that workflows for a particular instance of a project are executed.

The use of an environment group is highlighted through the use of an exemplary embodiment where an organization develops software using two different technologies. For example, the first technology is J2EE—i.e. Java 2 Platform, Enterprise Edition. The organization has a DEV (i.e. development) environment, a QA (i.e. quality assurance) environment, and a PROD (i.e. production or release) environment. All of these environments are specific to J2EE and include application servers pre-configured to a corporate standard. The second technology used by the organization is C++. There are also DEV, QA, and PROD environments set up for all C++ projects, but these environments use different physical servers than the corresponding J2EE environments. The software development organization thus has J2EE projects as well as C++ configured in the build management system 102. The J2EE projects should use the J2EE specific DEV, QA, and PROD environments, and the C++ projects need to use their own environments.

The EnvironmentGroup 1304 object in this embodiment is then used to limit the J2EE projects to use the J2EE specific environments (i.e. ServerGroup 1302). In the example, two Environment Groups are defined, a J2EE Env Group, and a C++ Env Group. The J2EE Env Group contains the J2EE DEV, QA, and PROD Server Groups whereas the C++ Env Group contains the C++ specific DEV, QA, and PROD Server Groups. This configuration prevents confusion about the set of servers a given J2EE or C++ project should be deployed.

ServerGroup 1302 comprise a groups of Agents 1310. Workflows within the system execute on a specified server group. This allows the user to define a single deployment workflow and then use it to deploy the application to the QA Environment and later the Production Environment with the proper server deployment. The user has a separate ServerGroup 1302 for the QA Environment and a separate Server- Group 1302 for the Production Environment. The same deployment workflow executed on the QA Server group would deploy the application to a QA environment adapted to handle the type of application, and then when it is executed on the Production Server Group it would deploy the application to the production environment, wherein the production environment is adapted to accept the type of development project that is being deployed by the particular instance of the project 800.

In one embodiment, agents are operated by the service component 512 and are present and operative across multiple server groups. Participation in multiple server groups allows the use of an agent that communicates with a network deployment manager capable of deploying applications to multiple environments.

The build farm server group is an implied server group that is part of the build management system 102. The build farm server group provides a default server group that contains all Agents 1310 that may be used for the pure build 200 processes. There are no inherent restrictions on how the build farm server group is used; so the build farm server group in some instances is also used for deployments as well. Also, there are no restrictions that prevent another (non-build farm) server group from being used for pure build 200 processes.

Build management system agents enable resource intensive tasks to be offloaded from the central build management system 102 server and shared with other ancillary servers. This makes much better use of available resources (such as CPUs) and allows for much higher build throughput as the agent model allows multiple builds to be shared and operating simultaneously with different agents.

In one embodiment, the build process system 102 agents are light-weight Java® processes that run on the service component 512 of an agent machine. The Agent 1310 process communicates with the central build management system 102 server via a secure TCP/IP socket. In one embodiment, all communication between the central server and the agent is secured using a transactional security layer or the secure, socket layer (SSL). The agent can be on a different network from the central or main build process system 102 server as long as the agent is able to open a socket connection to the server. This allows the agent to communicate with the central server over a WAN link.

In one embodiment, each agent is associated to a central server of the build management system 102. During installation, the user provides the location of the central server for which the Agent 1310 will be working. It is the Agent 1310 that contacts the server whenever the Agent 1310 process is started. Although an agent stores details about the central server and contacts, it does not mean that the central server will start sending work to that agent. In order to redistribute the workflow, it is necessary for the administrator of the central server to configure the servers to the server to use an agent. The administrator can also instruct the central server to ignore an agent.

In still another embodiment, the administrator configures the build management system 102 central server such that an agent is assigned a specific metric—e.g., covering the throughput metrics of the agent. The throughput metric is an arbitrary integer indicating the relative throughput of one agent relative to another. For example, if one agent is running on a 4 CPU machine and a second agent is running is running on a single CPU machine, then the throughput metric of the first agent may be four and the throughput metric of the second agent may be one. The order of available agent passing an agent filters is based on a combination of the agent throughput and current load.

An AgentVariable object 1312 allows the storage of agent variable information include the use of logical identifiers for settings that may be different on different agents. Agent variables allow the user to configure a build or another process using parameters whose values depend on the agent on which the build (or process) is actually executed. Agent variables are resolved at run time, on the actual Agent on which the build is running Consequently, agent variables are resolved at the time that the build is actually run by the service component 512 and on the actual agent on which the build is running.

Use of the AgentVariable 1312 is illustrated in the context of an example wherein the user is configuring a build of a project 800 and needs to use a specific version of the build management system 102. The user has one computer running the Linux operating system and a second computer running the Microsoft® Windows operating system. Both computers have build management systems, either one of which takes charge and runs the present instance of a living build 614 for this instance of the project 800. Further, the build management system 102 is installed in different locations on the Windows and Linux computers. An agent variable is used to configure the build management system 102 to utilize the build management system 102 on either of the agents.

Thus, using the agent variables, the user in some instances defines a variable named user/ANT_HOME on both agents. For example, on the Windows Agent, the value of the variable is be defined as follows:

user/ANT_HOME=C: \ apache\ apache-ant-1.6.5 and on the Linux Agent, the value of the variable would be:

user/ANT_HOME=/opt/apache/apache-ant-1.6.5

Typically, all environment variables, as well as all Java System variables on an Agent 1310, are automatically loaded and made available as agent variables for use by the agent and for the service component 512 operating the agent(s).

Agent variables are made possible by a distributed variable service. Because the variable service is distributed, a user can add new agent variables through the user interface 106 on a centralized build management system 102 server. Such user added variables immediately become usable just like the implicit environment and system variables.

An AgentFilter 1320 object is used to define agent filters that provide the user with the ability to select one or more agents at run time. Agents need to be selected for operation because all Jobs 1224 within the living build 614 component are executed on agents by the service component 512. So, the service component 512 uses information contained in Agent-Filter 1320 to determine which agent should be assigned a given Job 1224. In one embodiment, the AgentFilters 1320 are configured as activities (represented as an ActivityInstance 1202, which correspond directly to instances of Jobs 1224), and the change log based quiet period 900 (which also corresponds to a Job 1224).

In the exemplary embodiment discussed in FIG. 12, agents are allocated to server groups and instances of AgentFilters 1320 are scoped by the server groups. When the service component 512 implements an AgentFilter 1320, the service component 512 seeks to select one or more agents for use. Thus the service component 512 selects an agent for use from the available set of agents and then assigns the selected agent for use in a particular server group 608.

In one embodiment, there are three different types of AgentFilters 1320 available to the build management system 102: (i) Any Agent Filter 1330, (ii) Fixed Agent Filter 1332 and (iii) Variable Agent Filter 1334.

The Any Agent Filter 1330 returns all agents online in the current server group 608. In one embodiment, the returned agents are ordered by a combination of their current load and their throughput metric.

The Fixed Agent Filter 1332 returns a pre-specified agent. Use of this Agent Filter 1332 in some embodiments is discouraged because the pre-specified agent may not be available in the selected server group 608, thus causing the Job 1224 to fail. However the Fixed Agent Filter 1332 provides flexibility for users in specifying specific agents for retrieval.

In one embodiment the Variable Agent Filter 1334 returns any agent that matches a set of variable expressions to the agent's AgentVariable 1312. There are two types of variable expressions. One that requires the agent to possess a variable with the specified name and value. The other type requires the Agent to possess a variable with the specified name irrespective of value.

The first type of the Variable Agent Filter 1334 in the one embodiment is used to select agents with variable expressions such as:

env/OSTYPE=Linux where the agent is associated with a particular operating system (OS) or a particular CPU architecture is required.

The second type of the Variable Agent Filter 1334 in the one embodiment is used to select Agents with variable expressions such as:

env/ANT_HOME where agents with Ant installed on them are required; in this case it is immaterial where Ant is installed as long as it is installed somewhere among the server group 608.

2.e. Source Configuration

In one embodiment, the configuration of access to a Source Code Management (SCM) system in divided into at least two parts. The first part that is defined at a system wide level is the repository. Each instance of a repository allows a user to configure globally accessible information about a repository. The type of information captured by a repository instance depends on the concrete subclass of repository. Each different type of SCM would have a corresponding concrete subclass of repository. In this instance, the RepositoryImplCvs captures the information required to connect to a specific code versioning system (CVS) repository a type or in some cases a part of an SCM. The RepositoryImplSvn concrete subclass captures all the information required to connect to a specific subversion repository. Other SCM types have their own corresponding concrete subclasses of Repository.

The remaining configuration of access to an SCM is performed at the project 800 level. An instance of the project 800 has a reference to one or more instances of SourceConfigs 806. There is a concrete subclass of SourceConfig 806 for each type of SCM, and in some instances an alternative method of accessing that type or instance of the SCM. For example, in an exemplary case, called ClearCase, actually has several different SourceConfig 806 subclasses, one for using base mode and an existing snapshot view, one for using base mode and having the system create a new view for each build, one for using Unified Change Management (UCM) mode and using an existing snapshot view, one for using UCM and creating a new view for every build, and several more for using dynamic views.

Each SourceConfig 806 subclass determines what additional information it needs. For example, the SourceConfigImplCvs class needs to have one or more references to RepositoryImplCvsModule class instances which define what module the project 800 corresponds to in the CVS repository.

3. Living Build Configuration Process

Continuous integration allows the individual developers or users who are frequently committing new code to source control to integrate their source code changes with those of other developers many times during the course of a day. The role of the build management system 100 in such an environment is to attempt to identify when the integration has caused the quality of the project to degrade, so that corrective action can be taken quickly.

FIGS. 14-19 illustrate set of exemplary user interface screens depicting a project configuration process. These exemplary user interfaces are used to define parameters and variables associated with the previously introduced classes. Additional details regarding the operation of the build management system 102 are elucidated through an exemplary project configuration process as presented herein. In particular, FIGS. 14-19 describe configuration of a sample project in continuous integration utilizing a build management system based upon the living build model.

FIG. 14 depicts an exemplary user interface screen 1400 for specifying source code used by a project. In another embodiment of the project configuration process, the first step is providing information regarding source code location or source repository. To begin configuration of a project 800, the user selects the Administration Tab 1410 on the screen 1400 then selects "Repositories" and "Create New Repository" options to define the source code repository. Users can select the repository type appropriate for the project utilizing the repository type pulldown menu 1402. In this particular example, the open source SCM tool "Subversion" is used. For most repository types, users would not be required to enter detailed information about the project or module during the initial configuration of source code repository.

Based upon the selected repository type, the exemplary screen 1400 provides various text boxes to allow the user to provide relevant repository information, such as the name of the particular source code repository configuration, the uniform resource locator (URL) of the repository, and necessary access information (e.g., username and password) for the repository.

The user in some instances creates schedules associated with living builds. In one embodiment, schedules are used to determine when build processes will occur. A schedule creation screen allows users to create various types of schedules, such as cron expression schedules, which execute at a particular time as defined by the cron expression, and interval schedules, which execute at regular intervals. For example, a cron expression schedule can be utilized to schedule more exhaustive testing, such as nightly builds, outside of business hours. Alternatively, interval schedules can be utilized to schedule basic or abbreviated tests, such as those useful in continuous integration. During continuous integration, it is desirable to determine if the project has been changed on a regular basis, checking the status of the integration repeatedly.

For example, when creating a basic schedule in one embodiment, users input the schedule name, description and interval length. In some embodiments, the build interval can be quite short, such as three minutes. In addition to specifying the build interval, a start time is also defined. For a frequent schedule (e.g., three minutes), the start time is relatively unimportant. Start time becomes more important for schedules that run less often, such as schedules that execute only twice a day. For example, for a schedule executed at twelvehour intervals, a start time would determine the time of the first daily execution. The second execution would occur twelve hours later.

In one embodiment when users create a new project, they initially enter the project name and description. Additional configuration information, including status group, stamp style group and environment groups can also be specified. In another embodiment, a quiet period type and duration is selected for the project. For example, a change log quiet period is selected by the user, the duration of the quiet period is selected by the user. Based upon this quiet period specification, when a build is requested, the build management system 102 will begin by obtaining a list of revisions since the last build. If there have been any commits of source code during the quiet period (e.g., the previous sixty seconds), the build will be postponed. This prevents a build from occurring while a developer is checking into the SCM a series of related changes to the source code.

FIG. 15 depicts an exemplary screen 1500 for creating a module. Modules define location of source code within a source code repository or SCM. Frequently, a project 800 only utilizes one module; however, complex projects 800 in some instances utilize multiple modules and module definitions. The information entered in the module creation screen 1500 is dependent in part upon the particular type of SCM or source code repository being accessed. In the illustrated example, a Subversion repository is being used and the Subversion URL 1502 identifies the location where tagged builds can be copied.

Figure 16:
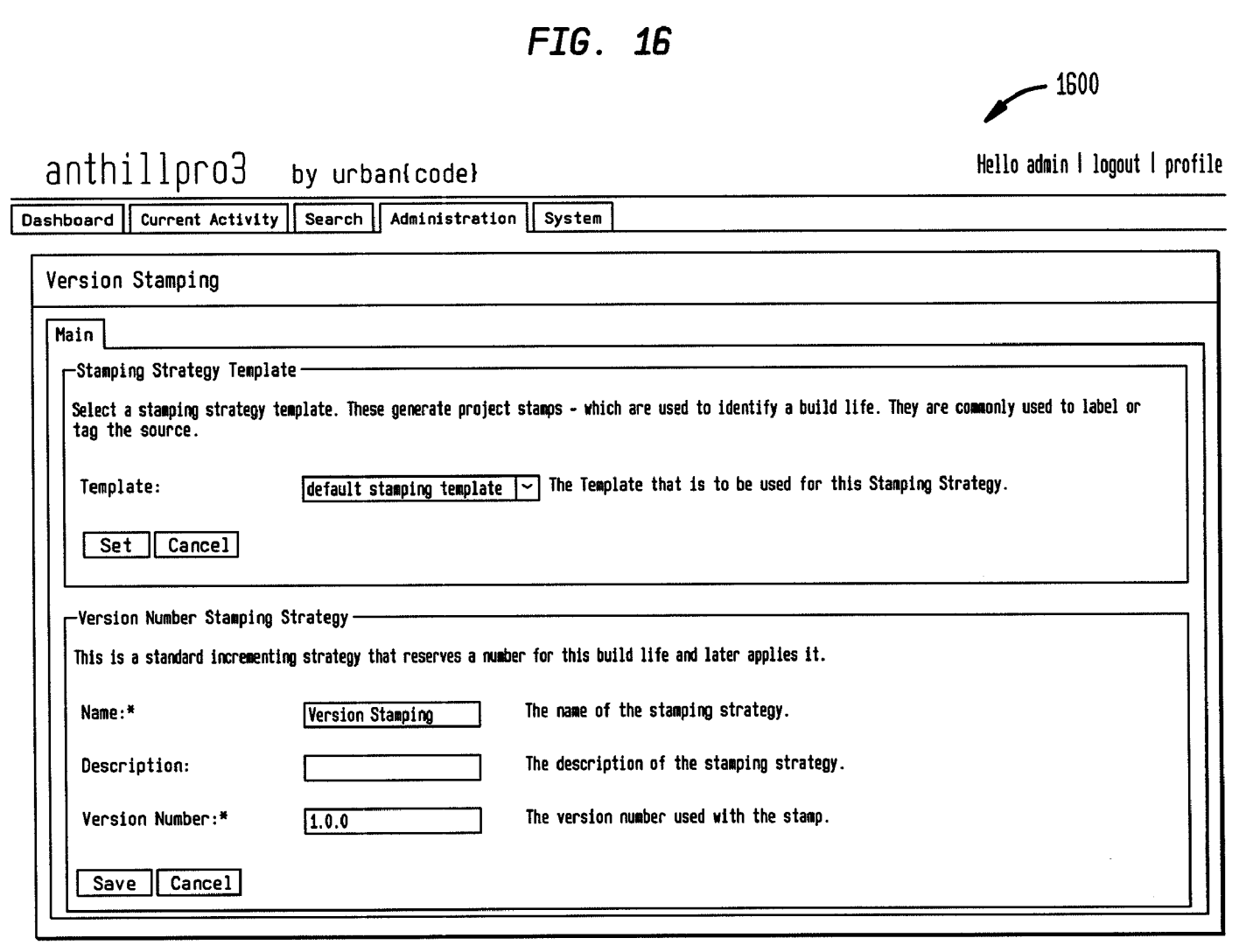

Turning now to FIG. 16, an exemplary user interface screen 1600 for stamping template creation is depicted. Stamping, as used herein, is a generic term for tracking version numbers, and similar build identifiers. A stamping strategy dictates how a particular project is stamped or assigned an identifier. In one embodiment, users can assign names to stamping strategies and set appropriate version numbers, such as for the main line of development for a project.

In the exemplary stamping template screen 1600, the default stamping template is elected. In another embodiment, the default stamping template takes the previous version number and for each build simply calculates the next version number. That calculated version number can be made available to build scripts, emails, and other participants in the build management system. If a build fails, this number will be rolled back to the previous version number. If it is successful, it will be incremented to the next version number.

In certain embodiments, the user interface provides for the creation of jobs, where a job configuration is essentially a list of steps that should be executed in order to accomplish a goal. In the current example, the goal is to perform a standard build. The user interface can also provide controls that define the interaction of the build job with source control, election of a stamping style and tagging. In the present example, the build is scheduled to run frequently. Accordingly, it may not in all circumstances be necessary or desirable to tag on every build or every successful build. In another embodiment, a second stamping process is created to perform this sub-tagging.

In other embodiments, the user interface provides additional options, such as cleanup and change logs options. If the cleanup option is selected, the system to try will produce clean builds. However, this is likely to slow the build process. For continuous integration build 302, cleanup may be undesirable. The change log option allows users to get the change log since the last time a custom status was applied. The change log status selection script is an advanced concept used mostly in complex environments. It calculates what status to use dynamically based on, for example, a bean shell script.

FIG. 17 illustrates an exemplary job creation screen 1700 for a user interface. In one embodiment, the job creation screen 1700 enables a user to configure scripts used to build the project 800. The job creation screen 1700 also allows the user to select a builder type. In the example 1700, a simple Ant script is used. If the appropriate type is not provided, a shell script builder can be used to enter an arbitrary command line. The exemplary project uses Ant, so Ant Builder is selected on job creation screen 1700.

The screen 1700 has a build script location input 1702 for the location of the build script. The location 1702 in some instances is relative to the directory from which the SCM checkout command was issued. In some embodiments, the ability to define a specified location for the Ant and JVM configurations is provided. The requested location information for Ant and JVM would be the location Ant and Java are installed. If every agent from which a build may be run has Ant and/or Java configured in the same location, a simple, single path can be entered in the job creation user interface 1700. However, the location of Ant and Java can vary between agents. In certain embodiments, the build management system 102 supports using a simple expression language to look up environment variables on the agent, and determine the appropriate location based upon such environment variables.

The exemplary job creation screen 1700 also includes configurable conditions that control build job processing by the service component 512. In one embodiment, a continuation condition 1704 is selectable. The continuation condition determines the conditions under which the next step within the build job is to be performed. In most instances, if any previous steps in a job have failed, continuing to run the build job is likely to be pointless. To reflect this, the "all steps passed" continuation condition 1706 is selected, indicating that the current step is to be performed only if all previous steps have passed. Other continuation conditions 1706 are selectable by the user based on the objective the project 800 and the job itself. In another embodiment, the exemplary screen 1700 also provides a timeout option 1708. The timeout option automatically fails the build and attempts to halt or kill processes that exceed the timeout period. This allows the build management system 102 to detect when the service component 512 or an external module hangs during the build or for some reason, the build processes will be automatically failed.

In other embodiments, the user interface also provides for configuration of publisher options associated with a job. In a simple example, configuration process can include addition of a change log publisher. As a result, a formatted version of the change log is included in the build's artifacts or reports tab.

In one embodiment, additional inputs are accepted from the user to further configure a job by defining the list of steps for the particular job. The user provides activity configuration information regarding where a particular job should be run and if any other jobs should be run with it. For example, in one instance a simple activity is defined which does not run concurrently on multiple machines or with other jobs. In another instance, a complex instance is defined that runs concurrently on multiple machines or is paired and run concurrently with other jobs.

Turning now to FIG. 18, an exemplary user interface screen 1800 for creating a workflow is illustrated. In this exemplary configuration process the user has been focused on configuring individual or isolated source repository types, stamping rules, jobs, activities and other items without specifying the relationships among the items. The workflow interface is used to assemble the various pieces into a more coherent whole and establish relationships and dependencies between individual elements of the project 800 definition.

The workflow creation screen 1800 depicts a workflow that creates a new build life, an originating workflow that is the user interface to the originating process definition 600. In this exemplary embodiment, the depicted workflow is named 1802, Mainline Build Workflow, and is assigned a server group 608 on which to build using the server group assignment input 1804, which in this case indicates the selected server group 608 is the Build-Farm group. The workflow creation screen 1800 also allows users to select a notification scheme using the notification scheme dropdown 1806. If notification via email is elected, the user may be required to enter an email address to which notifications are to be delivered.

The exemplary build does not use any resources outside of the build management system 102 that need to be identified and reserved, accordingly, the lockable resources input 1808 is selected for none on the exemplary screen 1800. In other embodiments, if a particular resource is necessary for the build process, users can specify such resources to be obtained prior to the workflow processing.

In another embodiment, each workflow is tied to a specific source configuration. This allows users to identify builds of the mainline as distinct from builds of some branch of the source code, while keeping jobs and activities as consistent as possible throughout the build management system. Users can also assign the stamping style selected in the build job, a stamping strategy.

The workflow creation screen 1800 also provides for specification of one or more activities associated with the workflow. In the illustrated example, the build activity is added to the list of activities the workflow is to execute. As a simple workflow, it will only execute this one activity. In other embodiments, the user interface allows the user to input the specifications of properties that must be set every time a workflow is executed. The workflow can be planned or triggered based upon a schedule defined during the configuration process. The user interface in some instances provides for creation of a trigger based upon the created workflow and the short interval schedule, as shown in the example workflow activities dialog 1810.

Figure 19:
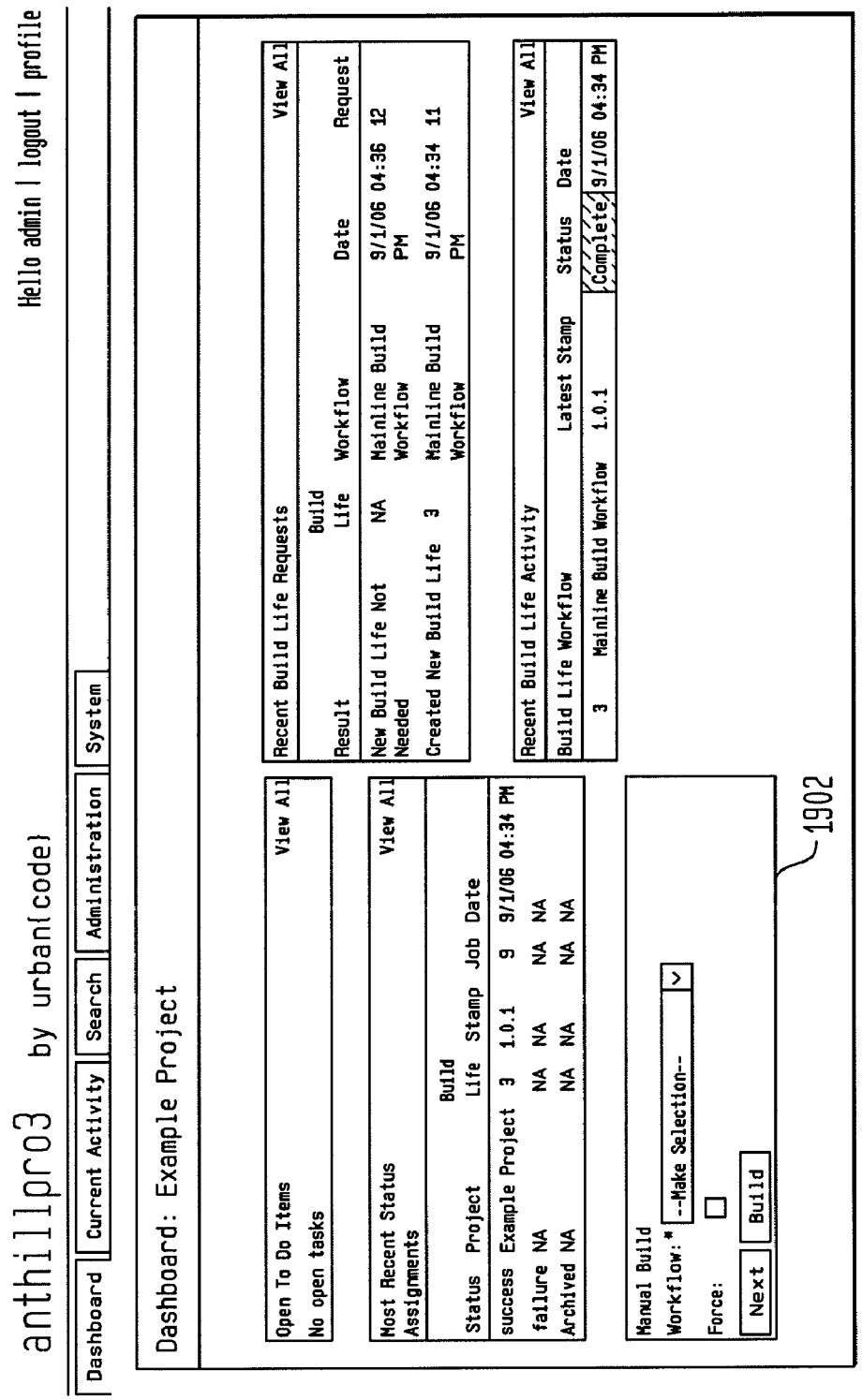
FIG. 19 details an exemplary dashboard associated with a project instance.

FIG. 19 depicts an exemplary dashboard screen 1900 provided to a user giving an overview of a particular project instance. The dashboard in this exemplary embodiment is configured to provide overview details of the project and also allows the user to take control the particular project instance. In exemplary user dashboard screen 1900 the use may manually trigger a build process via the manual build selector 1902. The dashboard screen 1900 also provides details to users to allow monitoring of the build processes and/or results obtained from the last build, including a summary of recent build attempts.

The preceding figures illustrated the generation of a basic build, but do not result in an ideal continuous integration system in place. The build management system can include additional features to assist continuous integration. In one embodiment, the system provides notifications that alert the development team when a build fails, allowing the team to respond quickly to problems.

In another embodiment, the build schedule is triggered based upon changes to source code committed to the repository, rather than the periodic schedule described above. The SCM can be configured to contact the build management system whenever files are committed to the SCM and the build can be converted to use a repository trigger. The build system could be configured to build every time there is a commit, without the necessity of polling the SCM system, checking out the source code and checking for revisions.

4. Artifact Management System

Figure 20:
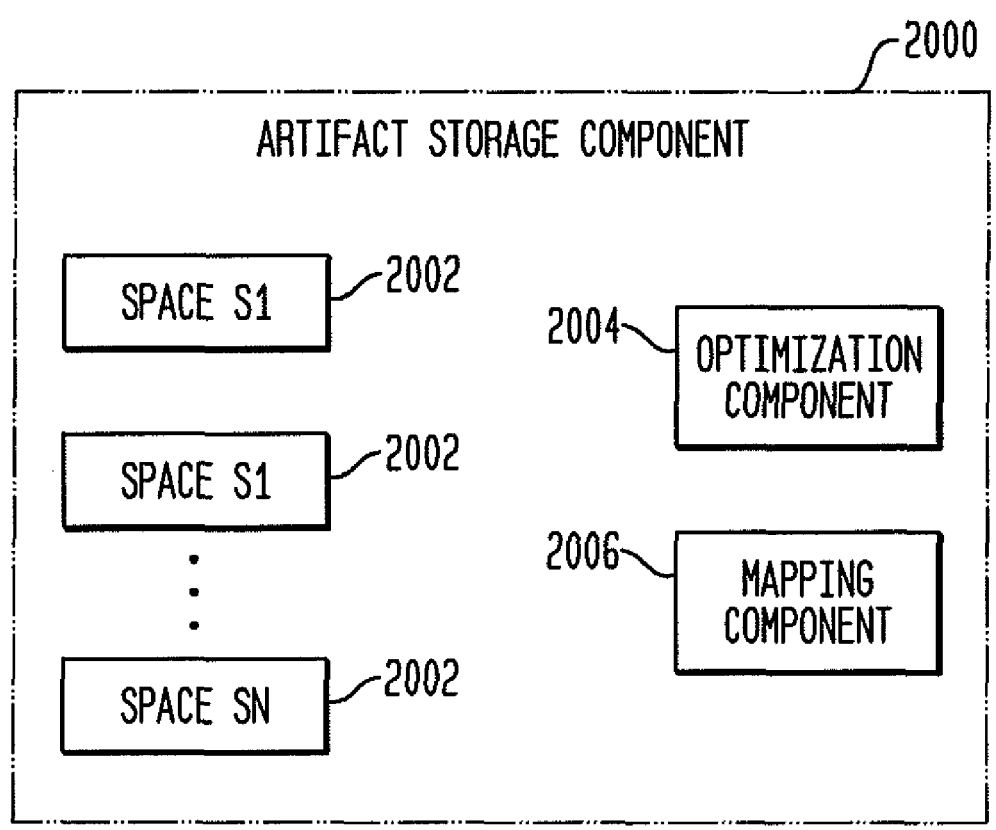
FIG. 20 is a diagram of an exemplary artifact storage system.

Referring now to FIG. 20, a block diagram of an exemplary artifact management system (AMS) 2000 is illustrated. Multiple artifacts are generated at different points in time during the life cycle of the living build 612. For example, during the initial pure build 200, an initial set of artifacts are created, such as, the transformed files, warnings, and other feedback from the transformation process 402 and the original source code documents. At a later point, the build management system 102 applies a secondary process, such as a series of QA tests, on the living build 612. The secondary process results in additional artifacts that are also associated with the particular instance of the project 800 that created the living build 612. In other examples, a three tiered application produces artifacts for the data tier, the business tier, and the web user interface tier. A build of a reusable component may produce artifacts that are the runtime portion of the component, such as, a dll, a jar, a shared library, as well as the documentation, all of which are examples of some artifacts known of those as ordinary skill in the art. A build may produce many different types of artifacts and all of these artifacts generated as part of the build management system 102 need to be stored and identified as belonging to the particular build that generated the artifact.

Turning once again to FIG. 20, the artifact management system 2000 is a specialized repository for optimized storage of artifacts in conjunction with the build management system 102. In artifact management system 2000, each build is allocated its own space 2002. The artifact management system 2000 can include any number of spaces 2002. Artifacts are grouped in spaces 2002 as a function of the build which produced the artifacts, where the artifacts produced by each build form a separate space 2002. Each space 2002 is an internal element associated with a specific build. Inside each space 2002 is a hierarchical namespace in which artifacts are stored. As a result, each space 2002 has its own logical hierarchical file system.

In one embodiment, the artifact management system 2000 includes an optimization component 2004 capable of performing optimization on the contents of the spaces 2002. The artifact management system 2000 maintains an ordering of spaces 2002 where the artifacts associated with each living build 612 are stored. The optimization component 2004 optimizes the storage of the content of a successive space 2002, when one of the spaces that precedes it in the ordering of spaces has similar content. Since spaces 2002 contain hierarchical namespaces for storage of content, the path of each node in the namespace is used to establish a mapping between the node and a corresponding node in a preceding space. For example, if space (S1) 2002 contains files /A and /B/B1 and space (S2) 2002 contains files /A and /B/B1, then node /A in S1 maps to node /A in S2 and node /B/B1 in S1 maps to node /B/B1 in S2.

In another embodiment, mappings between nodes or artifacts of different spaces 2002 is enhanced by mapping rules maintained in a mapping component 2006. The mapping component 2006 maintains a set of rules that covers scenarios where the name of a file or artifact changes from build to build in a defined or predictable manner. In many instances, the operation of the build management system 102 and/or the source code management system causes build artifacts to include either a build number or identifier in the artifact name. For example, build 1 may contain an artifact named A-1.ext while build 2 may contain an artifact named A-2.ext. In this example, to effectively optimize artifact storage, the mapping rules establish a mapping between A-1.ext and A-2.ext. For example, this is accomplished by a mapping rule such as: A-*.ext=>A-*.ext. The mapping rule defines the relationship between the pattern for the name of an artifact in a first space 2002 and the pattern for the corresponding artifact in a second space 2002, where the first space 2002 corresponds to a first instance of a living build 612 while the second space 2002 corresponds to a second instance of a living build 612.

In one embodiment, the mapping component 2006 is used in conjunction with the optimization component 2004 to reduce storage requirements. In one embodiment, the hierarchical namespaces of the various spaces are modeled as trees. Once the mappings between the trees of two spaces 2002 are determined using the mapping component 2006, standard tree and file differencing techniques are applied to optimize the storage requirements for the artifacts. For example, there is no need to store contents of any node in the second space (S2) 2002 whose corresponding node in the first proceeding space (S1) 2002 includes identical contents or artifacts. This optimization in some instances is applied at a coarser grain than single nodes, thus entire branches of the hierarchical tree are removed by the operation of the optimization component 2004. When a node or branch of the tree for space (S2) 2002 is optimized, only a pointer or a reference to the storage location of the corresponding branch in space (S1) 2002 needs to be stored in space (S2) 2002. In another embodiment, the names of the optimized nodes in space (S2) 2002 are maintained with the pointer or reference, if the name differs from the name of the corresponding node in space (S1) 2002, since the mapping rules of the mapping component 2006 allow for optimization when names have predictable difference.

In still another embodiment, artifact nodes themselves are optimized, even if the contents of two corresponding nodes are not identical. A binary diffing or comparison algorithm is used to determine difference between nodes. Only the difference from the previous node, rather than the entire contents for both nodes, need be maintained. In this manner, the artifact stored for the selected node for the second space (S2) 2002 is only a representation of the difference between the matching node in the first space (S1) 2002 rather than the entire artifact that would otherwise be present at the node.

Storage optimization within the optimization component 2004 is not limited to consecutive spaces 2002 within the sequential set of spaces 2002. Because there is a defined ordering or sequence of spaces 2002 within the artifact management system 2000, a node in a first space (S1) 2002 can be compared to a node in the closest preceding space (S2) 2002 that contains a corresponding node. Not every space 2002 in a consecutive sequence of spaces 2002 is going to contain the same nodes or files. For example, a space (S1) 2002 may contain a node A, which may not exist in space (S2) 2002, but may again reappear in space (S3) 2002. In that example, unless a mapping rule applies, node A in space (S3) 2002 corresponds to node A in space (S1) 2002. Thus, in yet another embodiment, the storage of node A in space (S3) 2002 is optimized based upon node A in space (S1) 2002 rather than the immediate prior space (S2) 2002.

In yet another embodiment, the node is optimized based upon the closest preceding space 2002. For example, if there is a space (S0) 2002 that also contains node A, in addition to the spaces (S1) through (S3) 2002 described in the example above, then the storage of node A in space (S3) 2002 is optimized by tracking the difference against node A in S0 and not A in S1.

In still another embodiment, the artifact management system 2000 attaches a property, referred to as status, to a space 2002. The status property is used by the artifact management system 2000 to make decisions about storage optimization as well as reclamation of storage capacity. The use of status is illustrated in the following example. Space (S0) 2002 has a status of "final" and contains node A, space (S1) 2002 has a status of "tested" and contains node A, space (S2) 2002 has a status of "tested" and does not contain node A, and space (S3) 2002 has a status of "new" and contains A. The optimization component 2004 is configured to select the closest preceding space with a particular, desired status for a corresponding node.

Thus, in our example, even though space (S1) 2002 has node A and is closer to S3 than S0, the optimization component may compare node A in S3 to node A in S0, if the optimization component is configured to compare only against spaces with a "final" status.

In still another embodiment, the optimization component 2004 further comprises a space reclamation algorithm that deletes the contents of a space 2002 that has achieved a specified status. Prior to deletion of contents, the optimization component 2004 verifies that there are no spaces 2002 whose nodes are compared against the content of the space 2002 being deleted. Deletion under those circumstances could cause a loss of data.

In one embodiment, any node within a space 2002 is only written to once. Nodes cannot have their values overwritten and they cannot store multiple revisions of their contents. In a further embodiment, spaces 2002 are closed once their contents are complete, where closed spaces 2002 are unable to accept any new nodes. In this manner, the artifact management system 2000 is able to lock and prevent additional modifications to the artifacts that comprise a specific living build 612 project 800.

Figure 21:
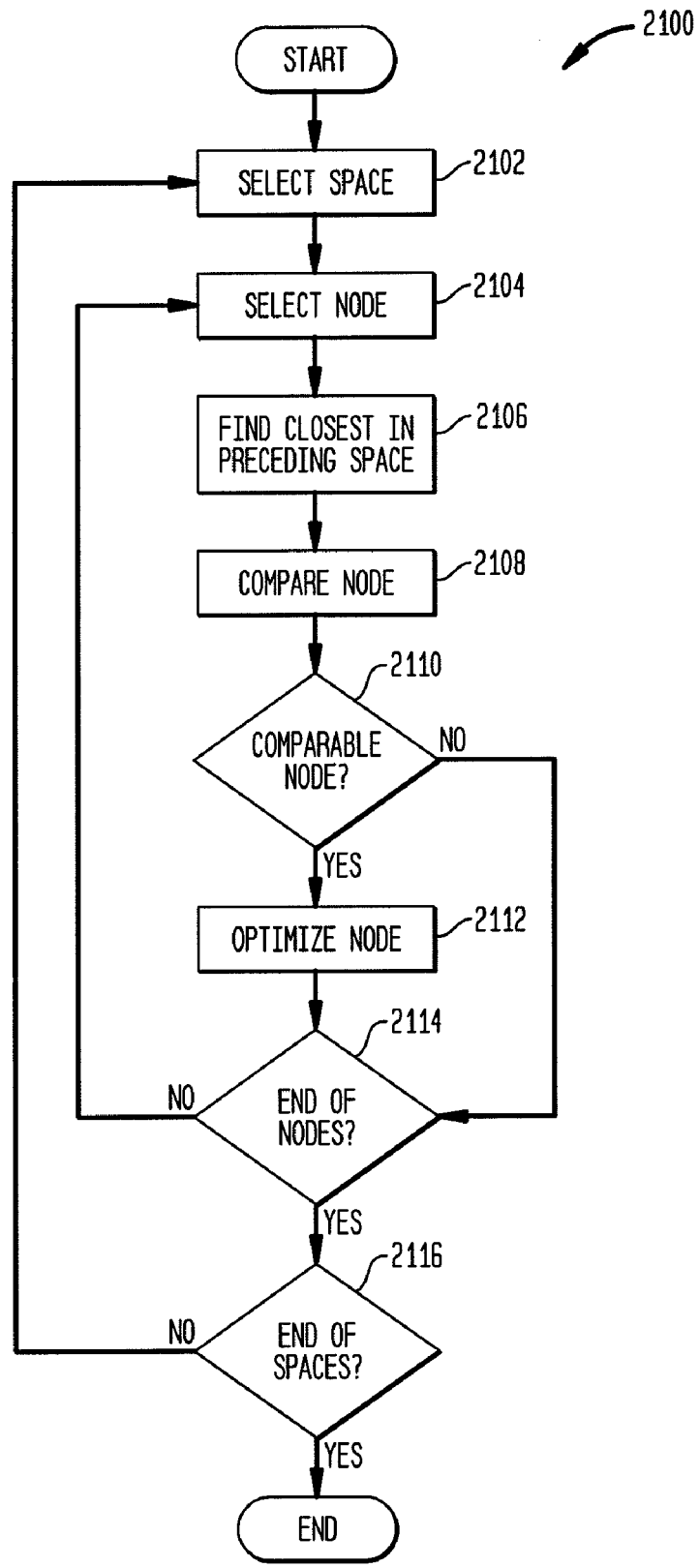
FIG. 21 is a flowcharts detailing one methodology for optimizing storage of artifacts.

FIG. 21 is a flowchart of an exemplary methodology of storage optimization process 2100 for optimizing storage of artifacts. Optimization of artifacts can be performed periodically, or dynamically. For example, when total storage used exceeds a predetermined limit, optimization is invoked directly from the user interface. At step 2102, the optimization component selects a space for processing based upon the sequential order of the spaces 2002. At step 2104, the optimization component selects the next node or branch for processing. A variety of tree traversal algorithms are utilized to determine node selection in various embodiments.

Once a particular node or artifact is selected, the optimization component 2004 locates the corresponding node in the closest preceding space at step 2106. In certain embodiments, the mapping component 2006 is used in conjunction with the optimization component 2004 to identify corresponding nodes with predictable naming variations. The node is compared to the closest corresponding node at step 2108.

At step 2110, a determination is made as to whether the node is comparable to the corresponding node. If yes, the node is optimized at step 2112. In another embodiment, optimization is implemented using a pointer or reference to the corresponding node if the nodes are identical. In a further embodiment, the pointer is augmented by a difference file (such as a difference file generated by a binary diff process) that tracks the differences between the current node and the preceding node. If the nodes are not comparable, the process continues at step 2114, where a determination is made as to whether there are additional nodes to process within the present space 2002. If yes, the process returns to step 2104, where the next node in the present space 2002 is selected. If no, the process continues to step 2116, where a determination is made as to whether there are additional spaces 2002 to process. If yes, the process returns to step 2102 where the next space 2002 is selected. If no, the optimization process terminates.

5. Dependency Management System (DMS)

Typically, software is composed of a set of interdependent components or modules. During software development, the modules are in a constant state of flux as developers add, update or delete modules. These constant changes often result in challenges tracking the dependency relationships among modules. For example, an application includes modules A and B, where module A is dependent upon module B. However, if module A and module B are constantly changing, it may be difficult to determine the particular version of module B that a given version of module A is dependent upon. Managing tracking dependencies between two modules is inefficient and error prone. A similar dependency issues exists between modules having different development life cycles.

In one embodiment of the build management system 102, a dependency management system (DMS) 514 is used to track the dependency among software modules. In particular, the DMS 514 maintains a set of dependency rules that define the relationships among modules. In some instances, the dependency rules define dynamic dependent relationships between modules. For example, every new build or version of module A is dependent on the latest build or version of module B available at the time that the new version of module A is generated. As additional versions of module B are created, the dependency of module A is dynamically updated, allowing the build management system 102 to track dependencies across the multiple changes in both module A and module B.

In certain embodiments, a dependency management system (DMS) 514 is combined with the build management system 102 to support a modular software application. Although in one embodiment, the build management system 102 does not require a DMS 514 to operate, additional functionality is available when the DMS 514 is integrated into the build management system 102 to work in conjunction with the other elements of the build management system 102. In a further embodiment, each module is configured in the build management system 102 as a project 800 which has a corresponding relationship in the DMS 514. By integrating the DMS 514 into the build management system 102, numerous benefits accrue including the ability accommodate smaller software teams that are typically more efficient than large development teams. Further, the decomposition of larger applications into separate modules allows for more efficient management and distribution of software development across distributed organizations, since each distributed team is assigned to an entire module as opposed to splitting a module among multiple distributed teams.

By decomposing a monolithic software application into interdependent modules, the impact of a broken build caused by code that does not compile is limited. For example, in a monolithic project with two hundred developers, a broken build will affect all two hundred developers. However, for the same project, separated into twenty interdependent modules with ten developers per module, a failed module build will impact only ten of the two hundred developers.

In one embodiment of the system 100, the DMS 514 utilizes information contained within the from a build management system 102 and more specifically from the living build component 502 to define dependency relationships of modules. The build management system 102 produces new builds or versions of modules. When configured appropriately, the build management system 102 is aware of every new build of every component. The DMS 514 uses the information contained in the build management system 102 to allow for additional types of dependency relationships.

In a further embodiment, the integration of DMS 514 with the build management system 102 allows for automatic build generation to support module dependencies. This automatic triggering is also referred to as "pulling" of additional builds. For example, when a build of a module A, which is dependent upon module B, is requested, the build management system 102 determines whether a new build of module B is required at that time. If so, the build management system 102 builds a new module B, which is then used to satisfy the dependency relationship. In another embodiment, a new build of B is required if the source code of module B has changed since the previous build of module B was generated; thus a new build of B is required to reflect the most recent source code changes. In summary, a request for a build of A pulls or triggers a build of its dependencies, such as module B.

In yet another embodiment, when a DMS 514 is combined or integrated with a build management system 102, builds trigger or "push" builds of dependent projects, as well as pulling builds of dependency projects. For example, if project A depends on project B, when there is a build of project B, the DMS 514 informs the build management system 102 of this dependency. In this embodiment, the build management system 102 evaluates the dependency based on its internal trigger rules and if the rules are satisfied, automatically generates a build of project A in response to the change in project B. In this embodiment, users configure projects to specify such automatic build generation criteria that triggers an automatic build of the proceeding project.

It is important that source code used for automatically triggered builds is consistent in date and time. For example, if a request for a build of module A is made at one o'clock in the afternoon, and results in a pulled build of module B, then the build management system 102 obtains the source code for the build of module B at one o'clock. If the build of module B takes thirty minutes to complete, then at one thirty in the afternoon, the build of module B would be complete and the build management system 102 turns to the build of module A. When building A, the build management system 102 uses the source code of module A as it existed at one o'clock. This maximizes the likelihood that the source code used for the build of A is compatible with that used for the build of B.

Figure 22:
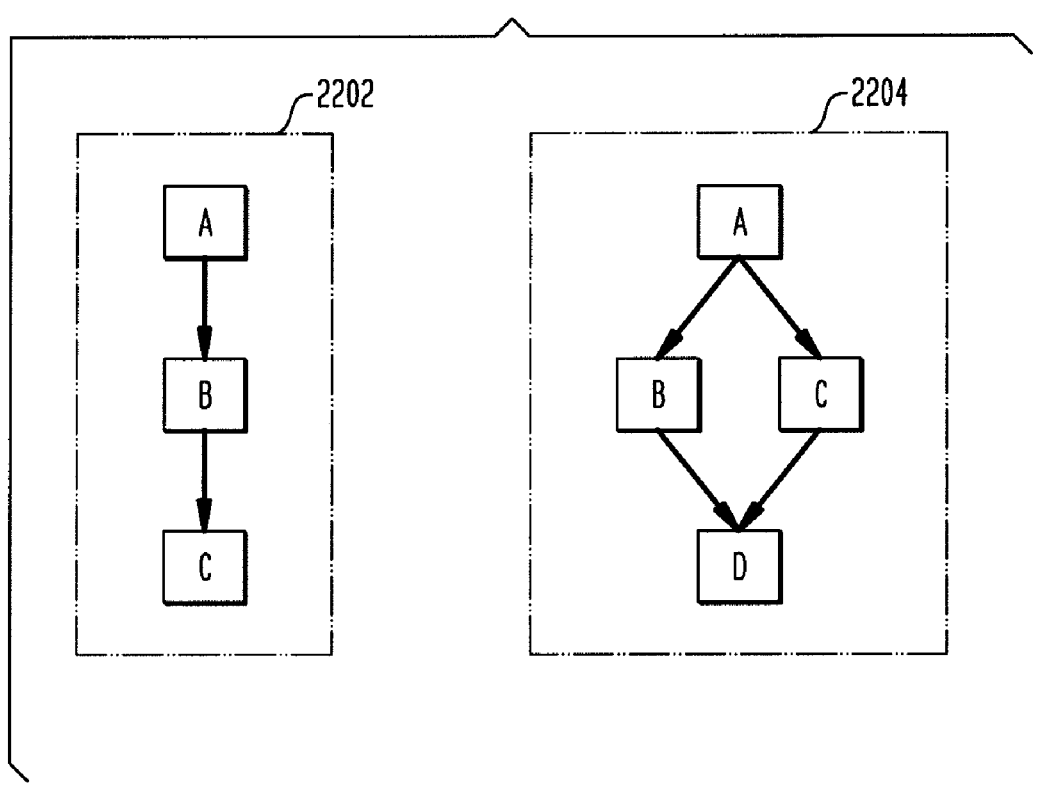
FIG. 22 illustrates block diagrams of selected exemplary dependency relationships.

Referring now to FIG. 22, exemplary dependency relationships are illustrated. In one embodiment, the dependency relationships are modeled as a graph, such as a directed acyclical graph, where the nodes of the graph represent modules and the paths between nodes represent dependency relationships. In graph 2202, module A is dependent upon module B, which in turn is dependent upon module C. One challenge of this type of graph structure is that in some circumstances there are multiple paths from one node to another node. For example, as depicted in graph 2202 module A is dependent on module B and C, and both B and C are dependent on D. Thus, A is transitively dependent on D via module B and via module C. The challenge posed by this dependency relationships is that the dependencies along the path A->B->D may, in some circumstances, differ from those dependencies along the path A->C->D.

When dependency relationships are evaluated at dependency resolution time (e.g. build time), the paths may lead to two different results regarding module D. One result is arrived at via one path (A->B->D) and a different result arrived at via the other path (A->C->D). The DMS 514 detects and handles cases where multiple paths connect nodes. In one embodiment, when the DMS 514 determines that the multiple paths resolve to produce multiple, non-equivalent, dependency versions, the DMS 514 simply issues a warning or error. In another embodiment, the DMS 514 is directed to favor a specific older build or older version. In yet another alternative embodiment, the DMS 514 is directed to preferentially selected the newer build or version. A user configuring the DMS 514 is able to select some or all of the above actions which are taken by the DMS 514 when confronted with multiple dependency versions.

In certain embodiments, the DMS 514 interacts with the artifact management system (AMS) 2000 as well as the living build component 502 in the build management system 102. Each module or node in a dependency graph is configured in the build management system 102 as a separate project instance with a living build configuration 612. The living build configuration 612 specifies how to produce new builds of versions of the module. In particular, the build takes build inputs, such as the source code, and performs the transformation process 402 to generate build artifacts or modules. In these certain embodiments, the transformation process 402 is accomplished via a number of alternative ways including compilation, linking, packaging, etc., to name a few alternatives. The types of the resulting build artifacts also vary. For example, some types of projects produce a single Java archive (.jar) file that is to be used as part of a larger application. In contrast, other projects produce a dynamic link library (.dll) file. Still others produce separate runtime, test-time and debug-time artifacts as well as design and documentation artifacts.

There is no inherent limit to the types of artifacts that produced by a given living build 612. However, typically, similar types of projects 800 produce similar types and quantities of artifacts. For example, java library projects 800 typically produce run-time jar files, debug instrumented jar files, and javadocs artifact types. Java Enterprise Edition (JEE) three tiered applications typically produce artifacts for the data tier (sql scripts), artifacts for the business tier (ear or war files), and artifacts for the web user interface (web-ui) tier (static html or image files). Consequently, in one embodiment, artifact type models produced by a given type of project 800 build are created. These artifact model prototypes, to name a few exemplary model prototypes, contain run-time artifacts, debug artifacts, and documentation artifacts. Each artifact type in a particular artifact model is referred to as an artifact set. In one embodiment, the integrated build management system 102 with DMS 514, living build component 502, and artifact management system (AMS) 2000 utilize a common set of user defined artifact models.

In certain embodiments, artifact sets map to the particular artifacts produced by a living build 612. The AMS 2000 stores artifacts produced by individual builds separate spaces 2002, where each space 2002 contains a hierarchical namespace for the build artifacts. Essentially, each space 2002 serves as a file system for a particular build by creating a local namespace unique to that space 2002. Artifact sets map onto the hierarchical namespace containing the artifacts.

The embodiments utilize multiple techniques for mapping artifact sets. In one embodiment, a combination of inclusion filters and exclusion filters are used to perform the mapping. An inclusion filter includes all files in the space 2002 that match the inclusion filter while in contrast, an exclusion filter excludes all files in the space 2002 that match the exclusion filter. Thus in one embodiment, an artifact is defined using a combination of inclusion and exclusion filters. For example, an inclusion filter such as "/runtime/**" would include all files and directories under the "/runtime" directory. Similarly, an inclusion filter such as "*.jar" would include all files with a jar extension. Various artifact sets are thus defined via the creation of inclusion and exclusion filters.

In certain embodiments, the DMS 514 is responsible for ensuring that artifacts of projects on which other projects depend, referred to herein as dependency projects, are available to the dependent projects. For example, in a Java environment, if project A is dependent on project B, and project B produces a runtime artifact B.jar, then B.jar should be available to project A during its build. It is the responsibility of the DMS 514 to ensure that the necessary artifacts, such as B.jar in the preceding example, are available to dependent projects. The DMS 514 utilizes the dependency relationship rules to determine the necessary artifacts and which particular build or version of the artifacts are required.

Figure 23A:
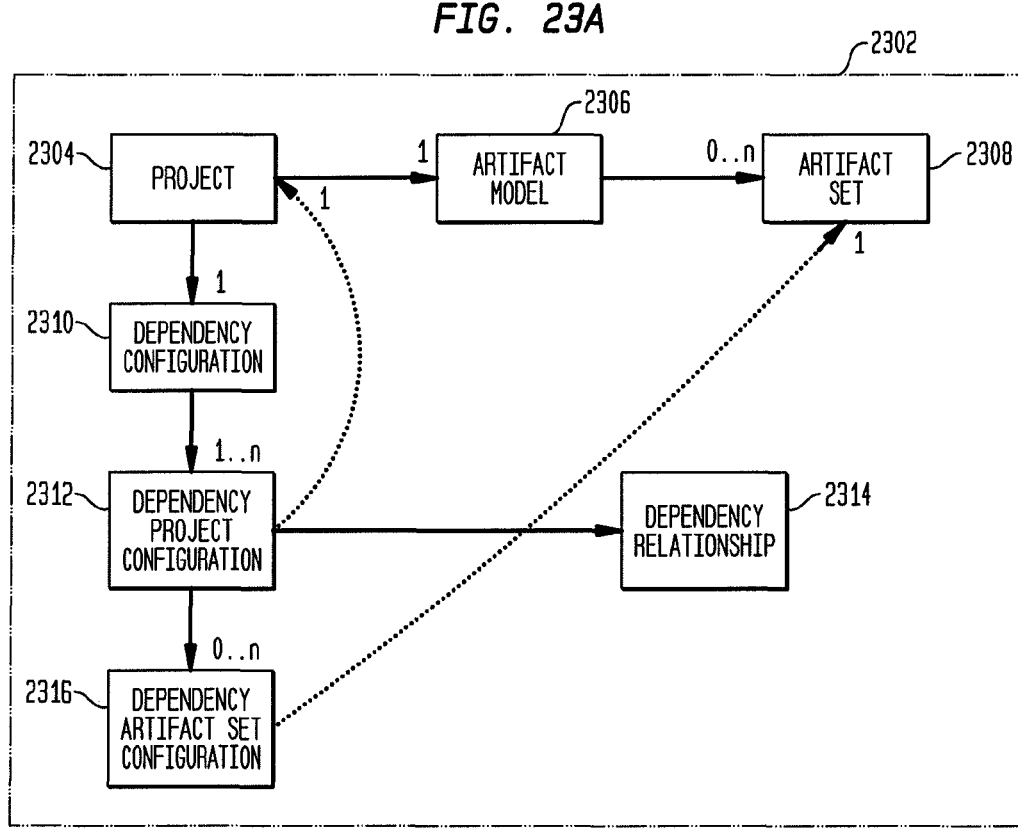
FIGS. 23A, 23B, and 23C diagram three separate dependency relationships.

Referring now to FIG. 23A, a relationship diagram 2302 illustrates an exemplary embodiment of relationships between project module 2304, an artifact model 2306, and artifact sets 2308. When a project module 2304 is dependent upon another project 800, the dependent project module 2304 may require artifacts from one or more of the artifact sets 2308 of the artifact model 2306 of the dependency project 800 and its corresponding dependency project module 2304. In one embodiment, users configure the details for particular dependencies. As illustrated in relationship diagram 2302, a project module 2304 can have a dependency configuration 2310 that specifies the dependency relationship between that project module 2304 and other projects 800, referred to as the project dependencies. The dependency configuration 2310 also specifies the artifact sets 2308 that the project module 2304 requires. For each such artifact set 2308, the dependency configuration 2310 specifies what is to be done with the artifacts in the artifact set 2308 of the dependency. In one embodiment, the files in the artifact set 2308, or a subset of those files as defined by an exclusion or inclusion filter or combination of inclusion and exclusion filters, are placed by DMS 514 within a directory that is accessible by a living build 612 of the project module 2304 being configured.

In the embodiment illustrated in diagram 2304, a project module 2304 references a single artifact model 2306 comprised of zero or more artifact sets 2308. Further, the project module 2304 contains a single dependency configuration 2310, which contains a set of dependency project configurations 2312. Each dependency project configuration 2312 references a dependent project and in essence establishes the dependency relationship 2314 between the project module 2304 containing the dependency project configuration 2312 (the dependent project) and the project 800 referenced by it (the dependency project). The dependency project configuration 2312 references a dependency relationship 2314, which defines whether each build of the dependent project module 2304 uses the artifact from latest available build of the dependency project, a specific build, or the latest build to attain a specific status. Each dependency project configuration 2316 contains a set of dependency artifact set configuration objects that specify what artifact sets 2308 in the dependency project are being used by the dependent project module 2304 and what is to be done with those artifacts.

In another embodiment, dependency relationships are structured in some instances to be transitive. For example, if project A is dependent on project B, which is dependent on project C, during build of project A, then the DMS 514 in some instances will update the artifacts of project C by triggering a build of project C. Certain dependency statements are ambiguous when used to define transitive relationships. For example, if a build of project A is configured to depend on the artifacts of the latest build of project B available at the of the build of project A, and project B has multiple artifacts sets, it not immediately obvious which of the artifact sets 2308 of project B that project A is to depend upon.

Figure 23B:
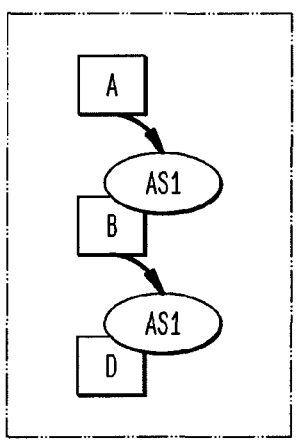

Turning now to FIG. 23B, a block diagram of an exemplary transitive relationship is illustrated. In one embodiment of the DMS 514, only dependency relationships 2314 on the same artifact set 2308 are transitive. Consequently, if project A is configured to depend on artifact set one 2308 of project B and project B is in turn configured to depend on artifact set one 2308 of project C, then the DMS 514 delivers the artifacts from artifact set one 2308 of project C when building project A. The implication of this implementation is that projects A, B, and C must share the same artifact set 2308 configurations and thus the same artifact model 2306.

Figure 23C:
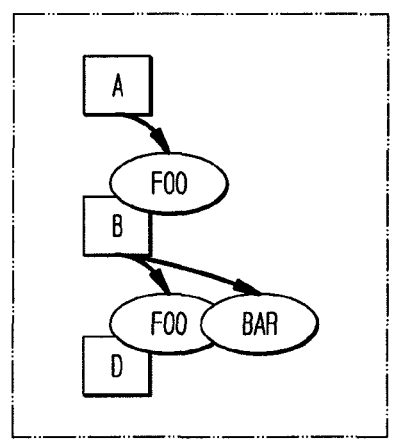

Referring now to FIG. 23C, a block diagram of an alternative exemplary transitive relationship is illustrated. In the illustrated embodiment, the DMS 514 provides for a mapping of corresponding artifact sets 2308 from different artifact models 2306 across the transitive dependency relationship. In yet another embodiment, the mapping uses the names of the artifact sets 2308 to establish the dependency relationship. As shown in FIG. 23C, if project A is configured to be provided artifacts from an artifact set 2308 named "foo" in project B and project B is configured to be provided artifacts from artifact sets 2308 "foo" and "bar" in project C, even though projects B and C have different artifact models 2306, the name equivalency of the artifact sets 2308 within the different artifact models indicates that project A would be provided the artifacts in artifact set 2308 "foo" of project C. In this embodiment, users are able to configure at each project 800 whether the particular project 800 allows transitive dependencies.

In still another embodiment, a project module 2304 contains multiple dependency configurations 2310 and each artifact set 2308 in the projects artifact model 2308 are linked to zero, one or more dependency configurations 2310 on the project module 2304. As a result, the dependency configurations 2310, which represent the dependency inputs of the project 800, are linked to the artifact sets 2308 which represent the outputs of the project module 2304. Thus, fine grained control over any transitive relationship going through the project module 2304 is provided. The transitive dependencies is traversed using the links from an artifact set 2308 to the dependency configurations.

Figure 24A:
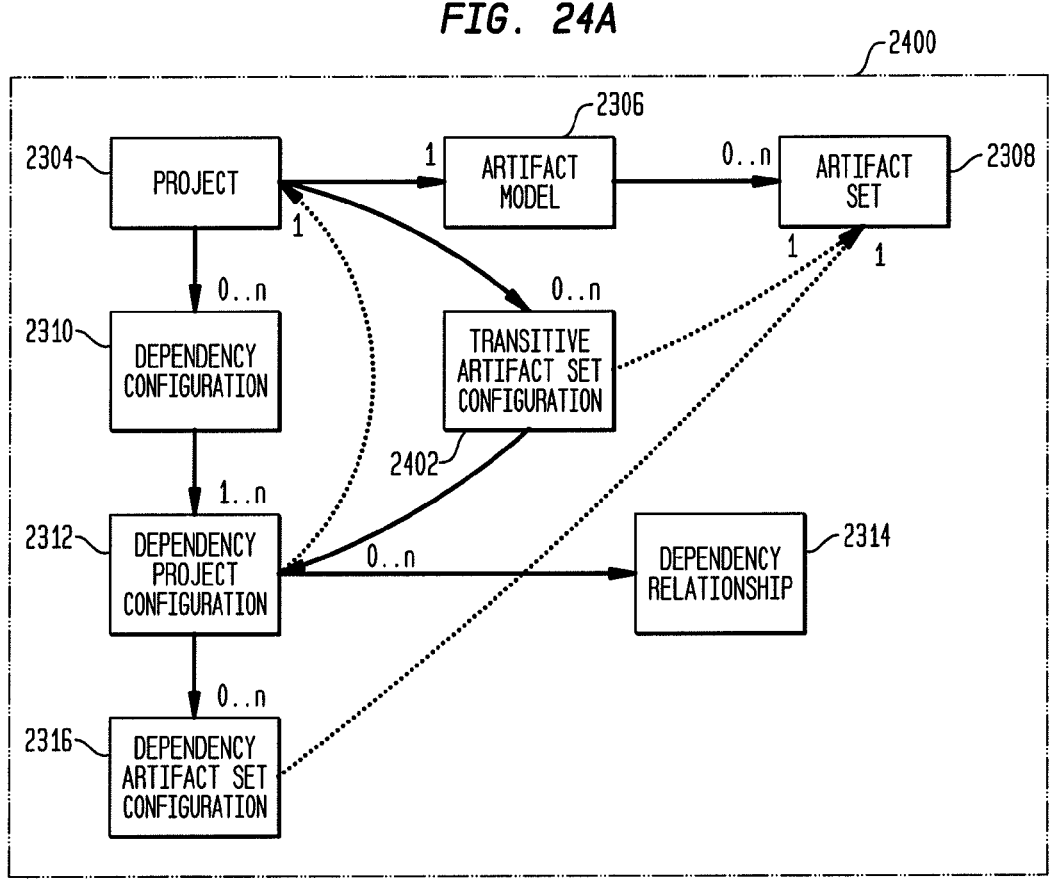
FIGS. 24A and 24B detail still more dependency relationships.

FIG. 24A illustrates another exemplary embodiment of dependency relationships. As illustrated, a project module 2304 references a single artifact model 2306, which can comprise of one or more artifact sets 2308. Each project module 2304 contains one or more dependency configurations 2310, which in turn contain a set of dependency project configurations 2312. Each dependency project configuration 2310 references a dependent project 2308 and in essence establishes the dependency relationship 2314 between the project module 2304 containing the dependency project configuration 2312 (the dependent project) and the project 800 referenced by it (the dependency project). The dependency project configuration 2312 references a dependency relationship 2313 that defines whether each living build 612 of the dependent project 2314 uses the artifact from the latest available build of the dependency project 2304, a specific living build 612, or the latest living build 612 to attain a specific status 1210.

In one embodiment, each dependency project configuration 2312 contains a set of dependency artifact set configurations 2316 that specify what artifact sets 2308 in the dependency project 800 are being used by the dependent project module 2304, and what is to be done with those artifacts. Another feature of this relatively complex dependency configuration is that the project module 2304 also contains a transitive artifact set configuration 2402 for each artifact set 2308 in the artifact model 2306 referenced by the project module 2304. The transitive artifact set 2402 establishes a link between an artifact set 2308, which defines the output of a build, and zero or more dependency project configurations 2312, which define dependency inputs. This link is traversed when resolving transitive dependencies.

Figure 24B:
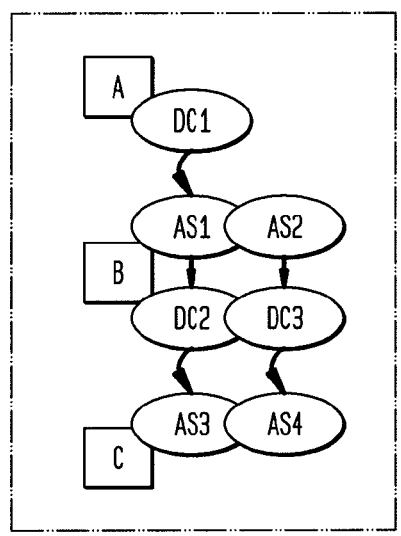

FIG. 24B illustrates additional exemplary transitive dependencies. Here, project A contains a dependency configuration (DC1) that specifies a dependency on project B and specifically on the artifact set AS1 in project B. Project B contains two artifact sets 2308, AS1 and AS2, as well as two dependency configurations 2310, DC2 and DC3. In this example, AS1 is linked to DC2 and AS2 is linked to DC3. Thus, when there is a request for transitive artifacts produced by AS1, the result should include all artifacts obtained from DC2. Similarly, when there is a request for transitive artifacts produced by AS2, the result should include all artifacts obtained from DC3. DC2 in project B is configured to obtain artifacts from artifact set AS3 in project C. Thus, whenever A resolves artifacts for the DC1 dependency configuration, the DMS 514 will select the appropriate version of project B (one matching the dependency relationship). The DMS 514 will then obtain the artifact of AS1 from the correct build of project B. After that, the DMS 514 will determine what build of project C was used for the selected build of project B, and it will select all the artifacts of artifact set AS3 on project C that were already obtained for the selected build of project B via the DC2 link.

6. Notification

In certain embodiments, the build management system 102 provides notifications to communicate the results of builds, deployments and promotions back to users. In one embodiment, the system 100 uses emails, instant messages, voice messages or any other suitable communication means to notify users.

In another embodiment, system notifications are configurable. Users define a notification scheme that specifies the users to contact, the events that trigger notifications, the method of notification (e.g., email, instant message) and a template for generation of particular notices. In further embodiments, a notification scheme is shared by multiple workflows, or even workflows in different projects. The criteria used to specify the users to receive notifications is adapted to utilize individual project information to determine the particular users to receive notification for different projects.

In a further embodiment, the notification scheme includes a user generator that selects the particular users to receive a notification. Different users will be interested in different events. For example, developers are going to be most concerned about broken builds; while a system administrator may be contacted when a build fails to start due to problems with source control. The user generator can be defined using a script that creates an array of users to notify for a particular event.

In a further embodiment, the notification includes a case selector that determines events that trigger notifications. The case selector is implemented as a script that examines events generated by workflows and workflow requests. Common triggers include success or failure of a workflow.

In another embodiment, the notification scheme includes a notification template that obtains event information, such as data regarding a build, and produces a document or notice that conveys that information. Different notification templates are appropriate depending upon the particular notification medium. Generally, a template used for instance messages is very short while one that targets Email needs to be longer.

7. Deployment

In certain embodiments, the build management system 102 is operated in a distributed system, using multiple machines. Typically, distributed systems include central controller node that hands out assignments to distributed agents that perform the work of each assignment and communicate the results back to the central controller. As used herein, the term "central controller" refers to the machine or process that coordinates the execution of jobs 1224 or tasks to be performed by the entire system 100. Each of the other machines in the system 100 are worker nodes, referred to herein as "agents." Collectively, the agents and the central controller are referred to as the grid. Agents within the grid have varying capabilities (e.g., available hardware or installed software). Therefore, it may be important to select the appropriate agent for a particular job 1224.

As used herein, a workflow is a collection of jobs 1224 that work together to accomplish some goal, such as deploying an application. A workflow may include a sequential arrangement of jobs 1224 where job A executes before job B. In another embodiment, a workflow provides for multiple parallel execution paths, where each execution path contains a sequence of jobs 1224 or another parallel process, and so on. The jobs 1224 may have specific preconditions (e.g., XOR, OR, or AND) that control the flow of processing.

In one embodiment, the grid is partitioned into one or more environments, where workflows are capable of being executed on multiple environments in the grid. However, each workflow is assigned to a single environment for execution. When a workflow is executed, it is bound to a particular environment on the grid. Consequently, the effects of the workflow are also limited to that environment. In addition, the individual jobs 1224 of the workflow are executed on the agents within that environment.

In still another embodiment, the system 100 includes agent filters 1320 that select appropriate agents for a workflow. Additionally, the system 100 utilizes environment specific properties to customize the deployment process for any target deployment environment. A workflow can be defined for deployment and be able to execute on any environment. The differences in the deployment topology between the environments are overcome by agent filters 1320. The differences in configuration in each environment are overcome by environment specific properties.

While the workflow is scoped or limited by an environment, each individual job 1224 that makes up the workflow is executed on a specific agent within that environment. Typically, in the deployment of a three-tiered application, including data access, business rules and user interface tiers, the deployment of each tier is handled by its own job 1224. Generally, deployment of an application is divided into segments, such as segments for transferring files to the target machines, configuring the deployment environment, activating the deployment, and the like. In a three-tiered application, each tier has its own deployment segments. Each segment may be implemented by one or more separate jobs 1224 or multiple segments may be implemented by a single job 1224. In yet another embodiment, the user is responsible for defining the segments and the jobs 1224 of the deployment workflow. Users can specify a workflow configuration as well as job configuration.

At execution time, a workflow is created according to its workflow configuration and executed. Similarly, each runtime job 1224 is created according to its job configuration. In a three-tiered application, it is typical to configure the deployment workflow using three jobs 1224 running in parallel, where each job 1224 is responsible for deploying one tier of the application. Each job 1224 is executed on an appropriate agent. For example, the job 1224 to deploy the data access tier runs on a database agent, the job 1224 to deploy the business rules tier runs on the business tier agent and the job 1224 to deploy the user interface is executed on the web user interface agent.

If a particular deployment job 1224 needs to run on multiple agents, multiple instances of that job 1224 are created, one for each agent. For example, a user interface tier of a three-tiered application is likely to be configured for high availability, including on multiple servers, such as multiple web servers to provide the web user interface content. In such a case, it may be necessary to deploy the user interface tier to each of the web servers; requiring the creation of multiple instances of the job 1224, one for each web server.

In certain embodiments, agent filters 1320 are used to select one or more agents for a workflow based upon a filtering algorithm. In another embodiment, users specify or configure the filtering algorithm utilized by the agent filter 1320. In general, the filtering algorithm selects agents based upon information regarding the agent's environment. Relevant information includes installation of particular software or the configuration of the agent. An agent filter 1320 may also select agents based upon user provided information associated with an agent. For example, users may assign or associate a particular role with an agent; such as DB server, BIZ server, WEB server, and the like. Also, an agent filter 1320 may use historical data about the agent maintained by the system 100. Historical data can include information as to whether a particular job 1224 was executed on the agent or the average duration for the execution of a particular job 1224 by the agent.

In one embodiment, the agent filter 1320 evaluates a list of all agents within the target execution environment prior to selecting one or more agents for deployment. In another embodiment, the list of agents is sorted or ordered according to various criteria, such as the level of free resources on the agent, thereby distributing workload. The agent filter 1320 then applies its selection algorithm to the list of agents and returns a sorted list of agents to which the workload may be assigned based upon the filter conditions. In a further embodiment, each job configuration includes an agent filter 1320 configuration wherein both may be configured by a user. At runtime, the agent filter 1320 provides the list of agents on which jobs 1224 conforming to the job configuration associated with the agent configuration should be run.

In certain embodiments, the system 100 is able to utilize a single configuration to enact deployments on multiple different deployment environments (e.g., QA, user acceptance testing, or production), even when the environments differ in deployment topology. Each segment of deployment is handled by a separate job configuration. Each job configuration has an agent filter 1320 that selects agents in the target environment for execution of instances of the job 1224. As a result, when agent filters 1320 are executed on environments with different deployment topologies, the agent filters 1320 yield different results, allowing the deployment workflow to be tailored to the target environment at execution time.

Users can configure deployment for a particular environment using environment specific properties. In another embodiment, a deployment workflow is configured to accept a set of user defined properties. Users provide runtime values for such properties at request time, when users request execution of the workflow. Alternatively, users provide value for properties as a part of the workflow configuration, referred to as configuration time. Request time property values are environment specific, since a request to execute a workflow specifies a single target environment. Configuration time properties may include different values for each possible target environment.

Deployment utilizing configuration properties can be illustrated using an exemplary three-tiered application. In the exemplary three tiered application, the business rules tier requires configuration with the location of the database. The quality assurance (QA), user acceptance testing (UAT), and production environments each have their own database instance. Therefore, when the business rules tier is deployed in the QA, it is configured to point at the QA database. In the UAT environment, the business rules tier is configured to point at the user acceptance testing database and an analogous configuration exists in the production environment. To provide for the varying database locations in the different environments, the user declares a property (e.g., DB_LOCATION) during configuration of deployment. The user then configures the value of this property for the various environments. For example, for the QA environment the property would point to the QA database. The user acceptance testing and production environment values of this property would also be configured accordingly. At runtime, jobs 1224 responsible for the business rules tier deployment obtain the value of the DB_LOCATION property and use that value to configure the business rules tier to point to the appropriate database.

8. Conclusion

While the system and method has been described in relation to selected exemplary embodiments with only a subset of the total number of examples possible, it will be apparent to those of ordinary skill in the art that the invention is not to be limited to only the disclosed embodiments. It will be readily apparent to those of ordinary skill in the art that many modifications and equivalent arrangements can be made thereof without departing from the spirit and scope of the present disclosure.

I claim:

1. A system for performing and managing the software build process, comprising:
    A server comprising storage and a service component;
    A source code repository containing source code;
    A means for performing a pure build with said service component to create an instance of a living build by transforming said source code and generating an artifact based at least in part upon a process definition associated with said living build such that said artifact is associated with said living build;
    A means for storing said living build and said artifact in said storage;
    A means for performing a secondary test on said living build with said service component and appending the results of said secondary test to said living build; and,
    A means for associating said secondary test to said pure build.

2. A system that manages software build processes, comprising:
    a source code repository containing a source code;
    a server adapted to execute a living build module, said living build module comprises:
        a definition component that includes configuration information associated with a living build; and
        a service component that performs a pure build to create an instance of said living build by transforming said source code and generating an artifact based at least in part upon said configuration information, wherein said service component performs a secondary test that acts upon said artifact to produce a secondary test result; and
    an artifact repository containing said artifact and said secondary test result, wherein said secondary test result is associated with said artifact and said living build.

3. The system of claim 2, wherein said service component performs a tertiary test that acts upon said artifact to produce a tertiary test result, and said tertiary test is contained in said artifact repository and associated with said artifact and said living build, such that both said tertiary test result and said secondary test result are traceable to said artifact and said living build.

4. The system of claim 3, said secondary test and said tertiary test are selected from the group consisting of an abbreviated test, an exhaustive test and a promote and deploy test.

5. The system of claim 2, wherein said definition component comprises a dependency management system that specifies at least one dependency between said source code and said artifact, wherein said service component performs said pure build triggered at least in part by said at least one dependency.

6. The system of claim 5, wherein said artifact repository contains a plurality of artifacts related to a first project and a second project and said dependency management system specifies a project dependency that describes a relationship between said first project and one of said plurality of artifacts associated with said second project, wherein said service component performs said pure build for said first project triggered at least in part by said project dependency.

7. The system of claim 2, wherein said configuration information specifies a quiet period service, where said service component utilizes said quiet period service as a control to determine timing for performing said pure build based at least in part upon a commit of said source code to said source code repository.

8. The system of claim 2, said artifact repository comprises a plurality of spaces for storage of said artifact, and further comprising an optimization component that maps said artifact to one of said plurality of spaces, said mapping designed to optimize storage.

9. The system of claim 2, said configuration information specifies a condition for cleanup and removal of said artifact of said living build.

10. The system of claim 2, said configuration information comprises stamp template that specifies generation of an identifier to be applied to said living build to assist a user in tracking said living build.

11. The system of claim 2, said configuration information comprises environment information, where said service component distributes performance of said pure build across an environment based at least in part upon said environment information.

12. The system of claim 2, said configuration information specifies a workflow comprising a plurality of jobs that are distributed across a server group.

13. A method for management of software, comprising:
    selecting a source code for transformation in accordance with configuration information associated with a living build;

generating an artifact as a function of said transformation of said source code in accordance with said configuration information;

performing a test process utilizing said artifact to generate a test result;

associating said test result with said artifact and said living build; and maintaining said artifact and said test result in an artifact repository, where said test result is associated with said artifact and said living build.

14. The method of claim 13, further comprising:

performing a second test process utilizing said artifact to generate a second test result;

associating said second test result with said artifact and said living build; and maintaining said second test result in said artifact repository, where said second test result is associated with said artifact and said living build.

15. The method of claim 13, wherein said step of generating said artifact is triggered by a dependency between said artifact and said source code, said dependency maintained in a dependency management system.

16. The method of claim 13, further comprising:

specifying a quiet period that defines a period of time that commences upon a commitment of said source code to a source code repository, where said period of time is reset upon a second commitment of said source code to a source code repository; and triggering said step of generating said artifact based at least in part upon said quiet period.

17. The method of claim 13, further comprising optimizing storage of said artifact in said artifact repository, where said artifact repository comprises a plurality of spaces.

18. The method of claim 13, further comprising removing said artifact of said living build based at least in part upon a condition specified by said configuration information.

19. The method of claim 13, further comprising distributing a plurality of jobs for said living build across a server group, based at least in part upon a workflow specified in said configuration information.

20. The method of claim 13, said configuration information comprises environment information, where the steps of generating said artifact and performing said test process are distributed across an environment based at least in part upon said environment information.

* * * * *